United States Patent [19]
Short, III et al.

[11] Patent Number: 5,607,140
[45] Date of Patent: Mar. 4, 1997

[54] ROTATABLE VALVE ASSEMBLY

[75] Inventors: Edward H. Short, III, Tulsa; John A. Tomasko, Claremore; Stephen P. Farwell, Owasso, all of Okla.

[73] Assignee: BS&B Safety Systems, Inc., Tulsa, Okla.

[21] Appl. No.: 519,653

[22] Filed: Aug. 25, 1995

[51] Int. Cl.$^6$ ............................................... F16K 1/226
[52] U.S. Cl. ................................... 251/305; 251/306
[58] Field of Search .................................. 251/305, 306

[56]                References Cited

U.S. PATENT DOCUMENTS

| 2,304,491 | 12/1942 | Allen | 137/70 |
| 2,358,101 | 9/1944 | Randall | 137/70 |
| 2,905,358 | 9/1959 | Herbage | 220/89 |
| 3,039,482 | 6/1962 | Goldberg | 137/68 |
| 3,472,284 | 10/1969 | Hosek | 138/89 |
| 3,603,333 | 9/1971 | Anderson | 137/70 |

*Primary Examiner*—John C. Fox
*Attorney, Agent, or Firm*—Dougherty, Hessin, Beavers & Gilbert

[57] ABSTRACT

Rotatable valve assembly includes a mounting mechanism for rotatably mounting the valve in a housing, the mounting mechanism including a shaft having an outside end extending through the housing. A conversion mechanism converts fluid pressure in the housing into torque exerted on the shaft. A release mechanism is located outside the housing for preventing rotation of the shaft and valve when the torque exerted on the shaft is below a selected magnitude. The release mechanism allows the shaft to rotate when the torque exerted on the shaft exceeds a selected magnitude. A seal is provided for sealing the gap between the housing and the valve in the closed position. The seal has a first portion secured to the housing on a first side of the rotational axis of the valve, a second portion secured to the valve on a second side of the rotational axis, a first transitional portion coinciding with the rotational axis, and a second transitional portion coinciding with the rotational axis. The seal is unsecured to the valve or the housing and the transitional portions so that the seal may flex in the transitional portions as the valve rotates between the closed position and the open position. The first and second portions of the seal define a seal plane in the closed position of the valve and the second portion of the seal moves out of the seal plane with the valve when the valve is moved out of the closed position.

41 Claims, 16 Drawing Sheets

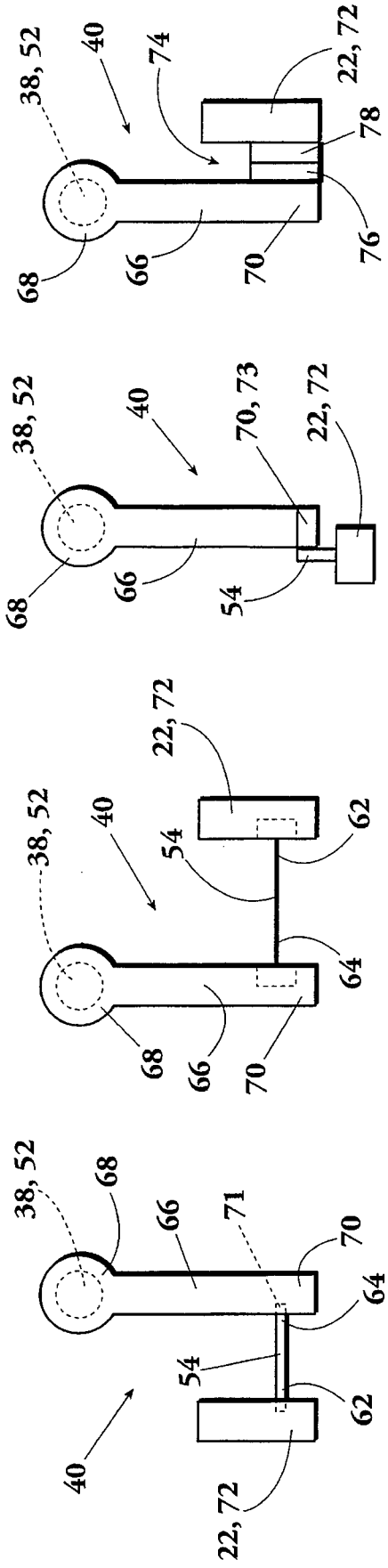
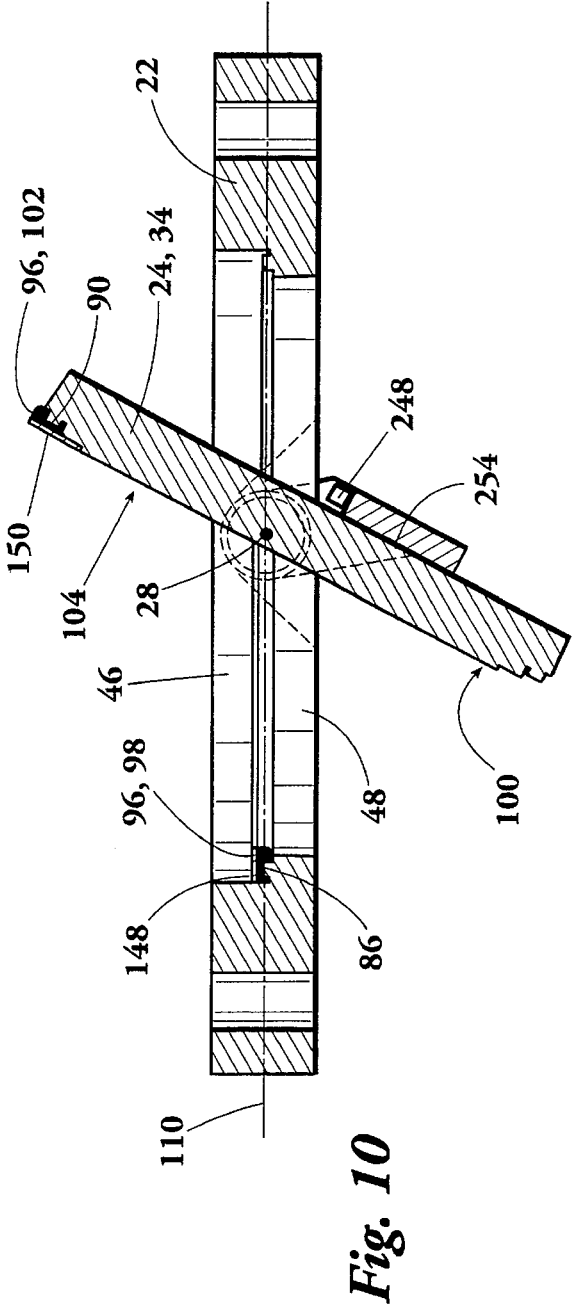

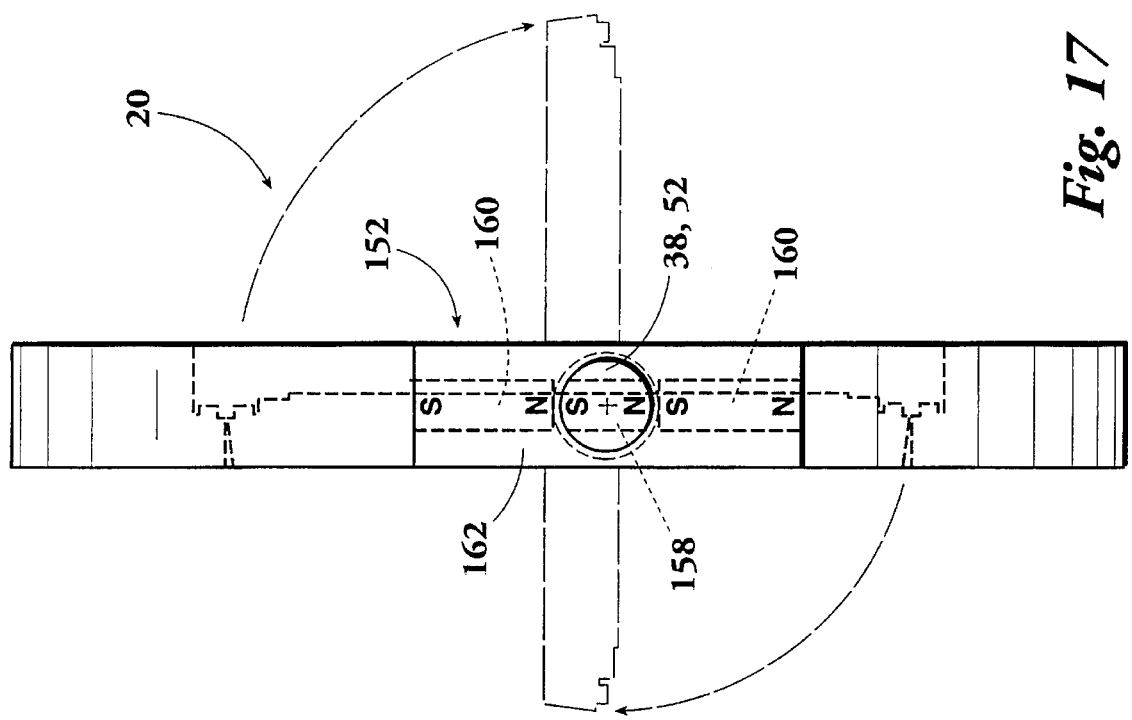
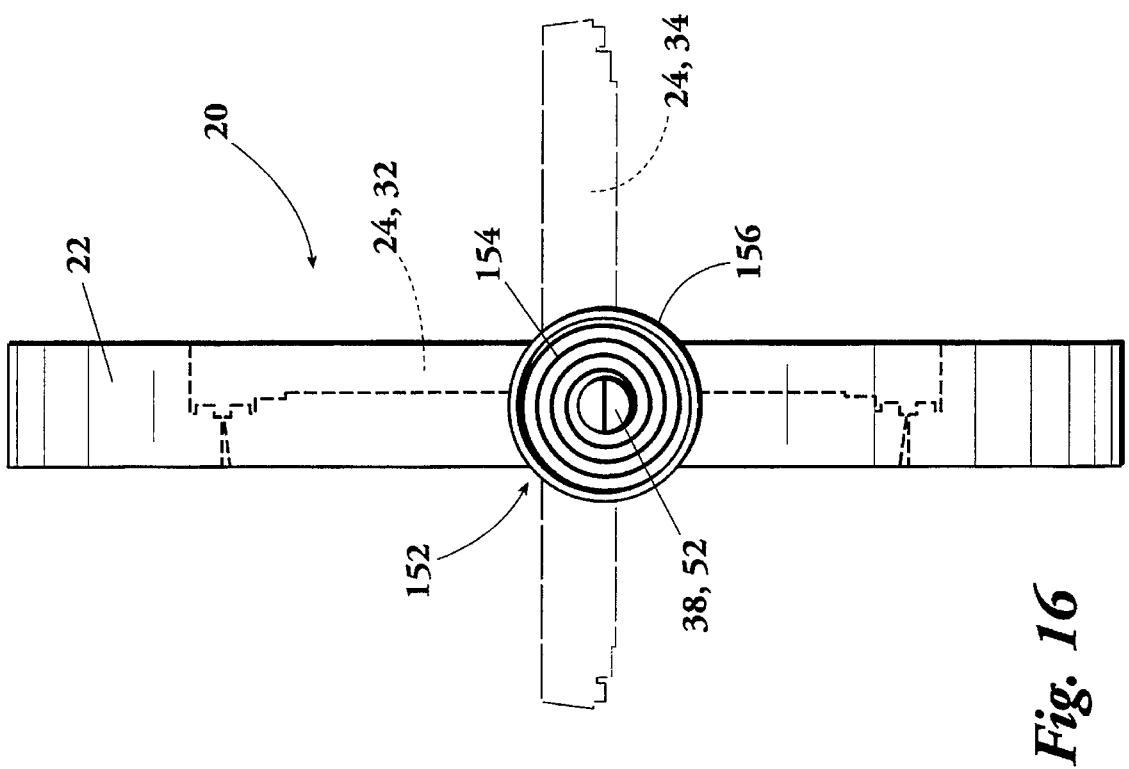

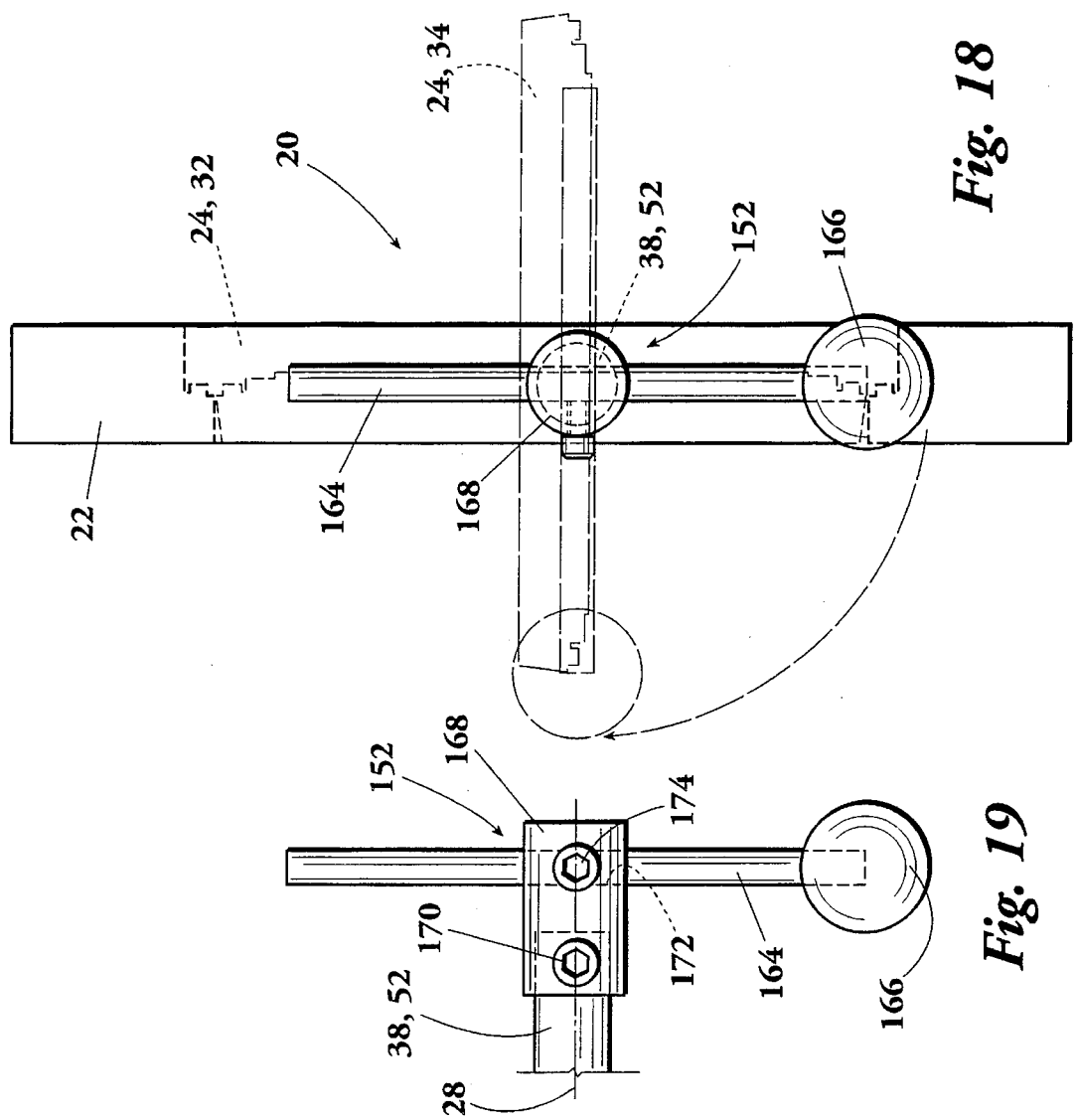
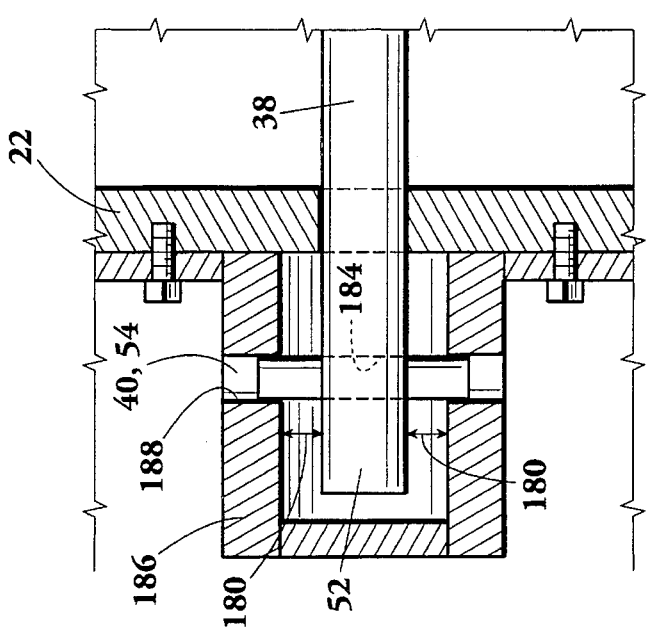

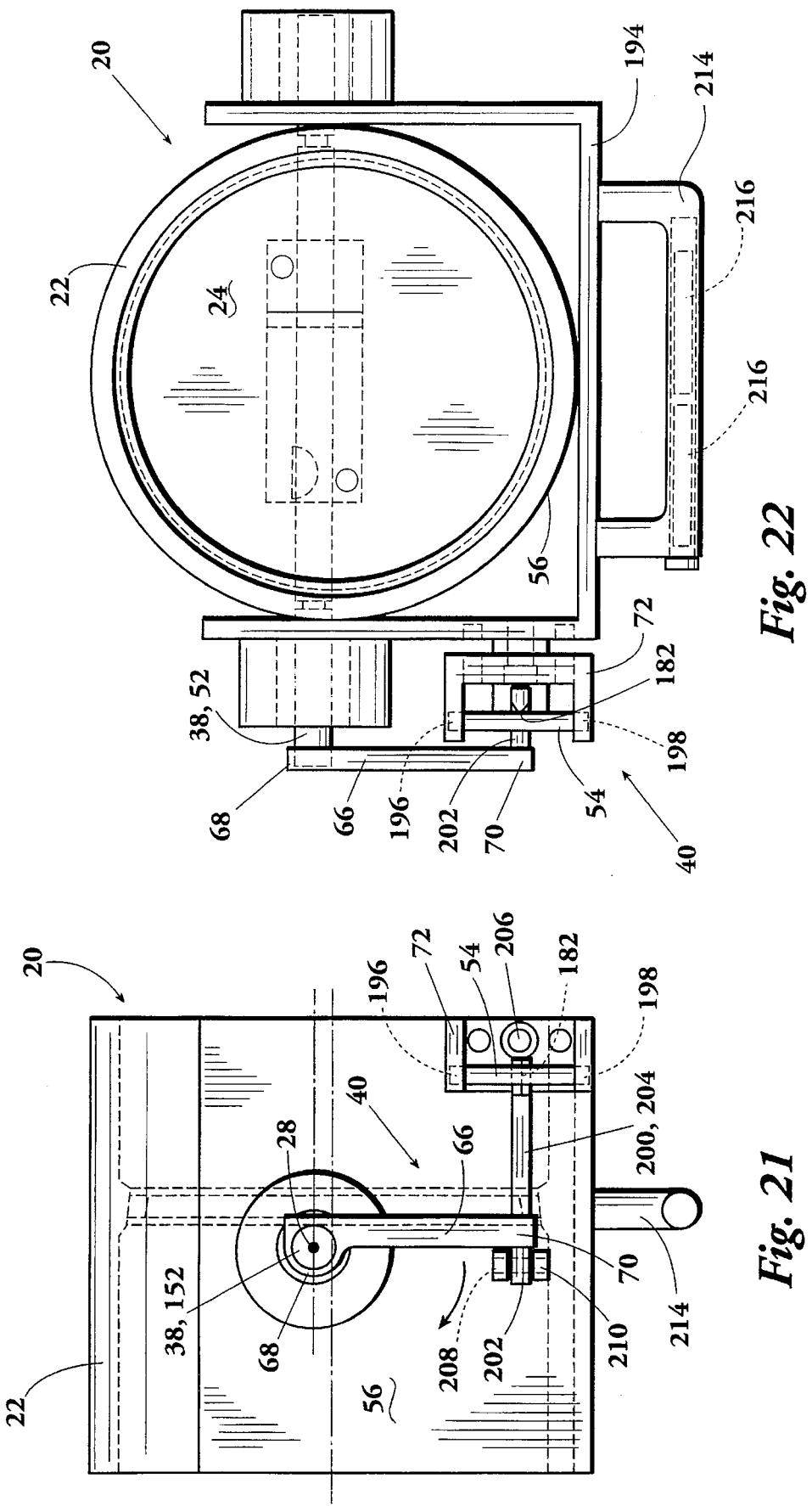

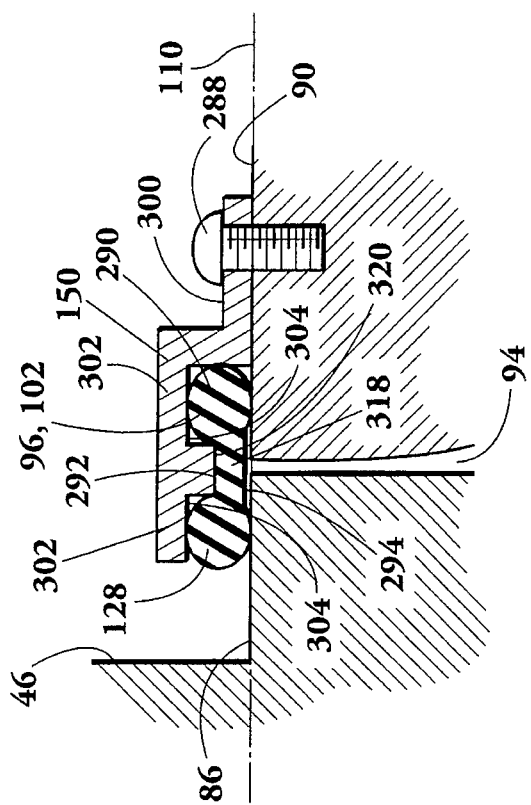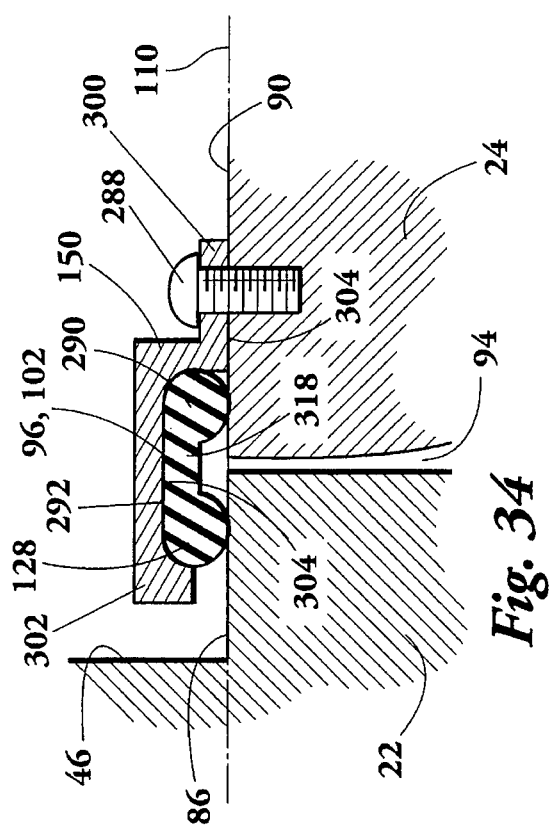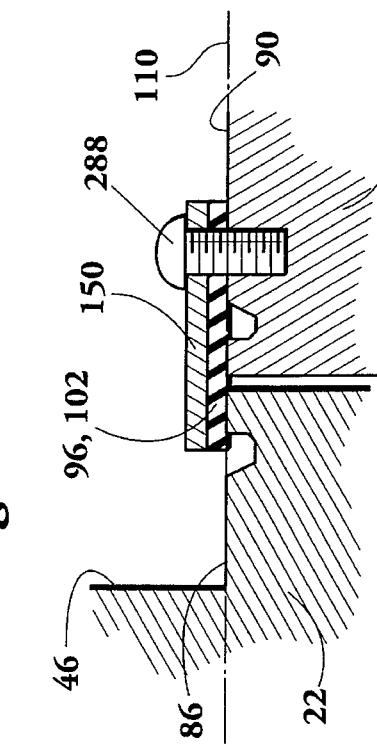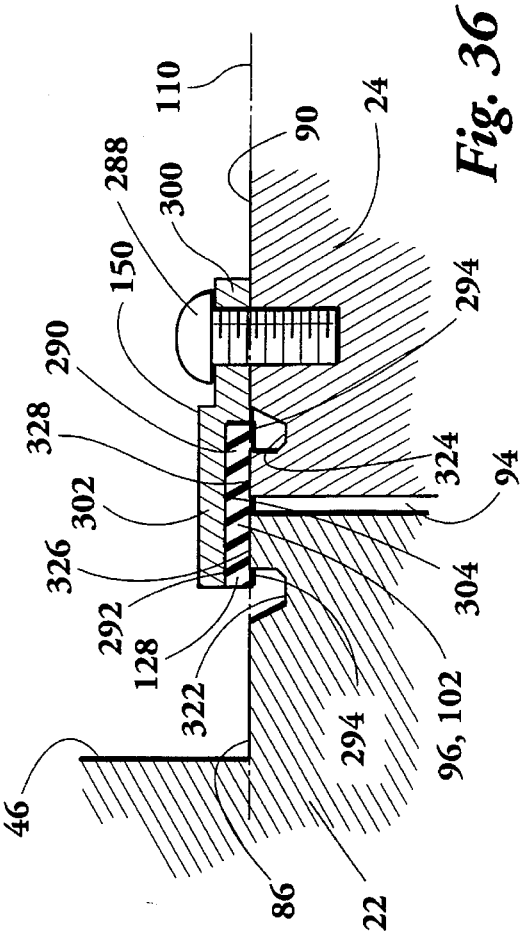

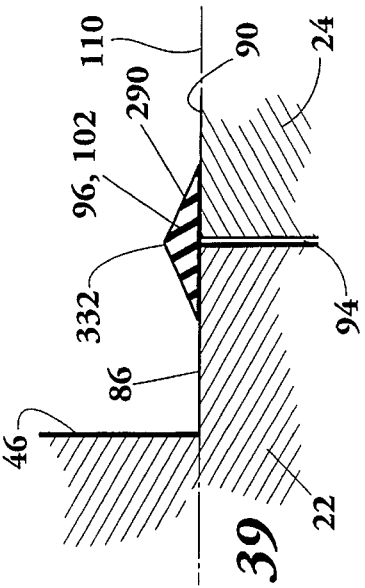
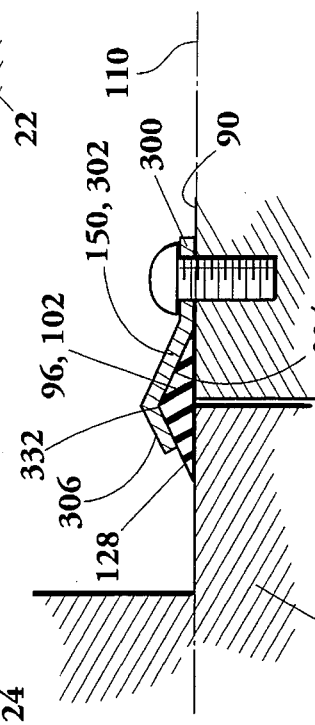
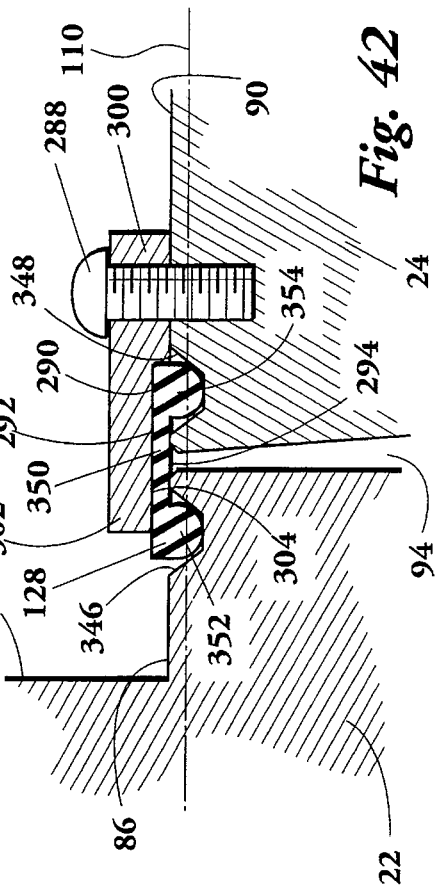
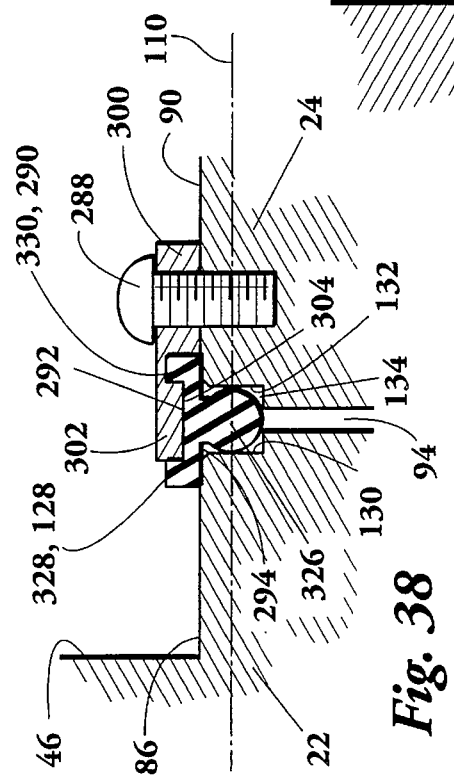

ROTATABLE VALVE ASSEMBLY

BACKGROUND OF THE INVENTION

The present invention relates to rotatable valve assemblies and more particularly, but not by way of limitation, to a rotatable valve assembly which may be used as a pressure relieving device.

The use of various sorts of rupture disks and pressure relief valves to prevent overpressure of a fluid pressure containment structure are known. For example, U.S. Pat. No. 3,472,284 (Hosek) discloses a pressure seal in which disks 26, 32 rotate about offset shaft 24. A diaphragm 14 is clamped between the disks and housing to seal the assembly and the diaphragm is sheared by the rotation of the disks when a desired fluid pressure is present. In order to reseal the valve, the housing members 10, 12 must be opened and the valve taken out of service.

U.S. Pat. No. 3,039,482 (Goldberg) discloses a butterfly-type valve in which the longitudinal axis of the inlet and the longitudinal axis of the outlet are offset so that when the valve is forcibly oscillated and the hermetic sealing sheet 13 is sheared, the sealing ring 18 on the lower edge of the valve 16 will safely clear the rough and sharp sheared edge of sheet 13. The inlet and outlet body sections 11, 12 must be taken out of service and opened in order to reseal the valve after a pressure relieving event.

U.S. Pat. No. 2,304,491 (Allen) and U.S. Pat. No. 3,603,333 (Anderson) disclose traditional right-angle relief valves in which a shear pin is used to hold the valve in a closed, sealed position until a preselected pressure is experienced in the inlet to the valve. Upon overpressure, the valve shears the shear pin and is moved to an open, pressure relieving position. Since both of these valves use a shear pin, the tolerances between the member holding the shear pin stationary and the moving member which shears the shear pin are critical to provide a predictable relief pressure. For example, referring to the Allen patent, the diameter of the stem 8 and the internal diameter of the bushing 9 through which the pin 13 passes must be carefully matched to achieve an accurately predictable shear pressure. As the space or gap between the sides of the stem 8 and the internal diameter of the bushing 9 increases, the force required to shear the pin 13 diminishes rapidly. This requires precision matching and matching of the componentry that is difficult and expensive to repeatably produce and to maintain. Other shortcomings of the right-angle relief valves include the increased body size and the flow restriction created by the right angle turn in the flow passageway, as well as the tendency of the valve to flutter or chatter on the seat during pressure fluctuations because the valve must resist the entire fluid pressure exerted at the inlet, i.e., the shear pin and spring must directly resist the full force exerted on the face of the valve by the inlet pressure and directly absorb all pressure fluctuations.

It is known to use rupture disks, such as reverse buckling rupture disks, to replace right-angle relief valves. Rupture disks have a lower cost per unit of capacity when compared to right-angle relief valves. However, rupture disks must be taken out of service to restore their pressure containing capability after a pressure relieving rupture. This requires either a redundancy (the use of multiple rupture disks in parallel), shutting down the system, or risking exposing the system to overpressure while the rupture disk is being replaced.

It is known to use rotatable valve assemblies, such as butterfly valves, ball valves, plug valves, and the like, to control or relieve fluid pressure in fluid containment systems. However, the prior rotatable valve assemblies known to the applicants typically require that the valve disk, ball, or plug, wipe or drag across a high friction, tight fitting seal made of elastomer or Teflon®. Therefore, a high torque is required to open the prior valve assemblies, and this torque increases with time while the valve is in a closed position.

Therefore, there is a need for a valve assembly which will provide fluid pressure relief at an accurately predictable relief pressure and which may be returned to its pressure containing state after a pressure relieving event without taking the apparatus out of service. There is also a need for a rotatable valve assembly which will reduce the frictional forces which must be overcome to rotate the valve between the open and closed position and in which the torque required to initiate rotation of the valve does not increase as the valve is left in a closed position for extended periods of time.

SUMMARY OF THE INVENTION

The present invention is contemplated to overcome the foregoing deficiencies and meet the above-described needs. In accomplishing this, the present invention provides a novel and improved rotatable valve assembly.

The invention is a rotatable valve assembly which includes a housing having an inlet and an outlet defining a fluid passageway through the housing; a valve located in the passageway which is rotatable between a closed position and an open position; mounting means for rotatably mounting the valve in the housing, the mounting means having a shaft with an outside end extending through the housing which is rotatable with the valve; conversion means for converting fluid pressure in the housing into torque exerted on the shaft; and release means, located outside the housing for preventing rotation of the shaft and valve when the torque exerted on the shaft is below a selected magnitude and for releasing the shaft in order to allow rotation of the shaft and valve to the open position when the torque exerted on the shaft exceeds a selected magnitude.

Preferably, the release means is a deformable means extending between the shaft and housing in order to prevent rotation of the shaft, the deformable means deforming or rupturing to allow rotation of the shaft and valve to the open position when the torque exerted on the shaft exceeds a selected magnitude. The deformable means may be a pin or beam which ruptures or which bends to allow rotation of the shaft and valve. In another embodiment, the release means is a magnetic catch which prevents rotation of the shaft until the torque exerted on the shaft exceeds a selected magnitude.

In another embodiment, the housing includes a housing seating surface having an inner peripheral edge extending around the passageway and the valve includes a valve seating surface having an outer peripheral edge extending around the valve. The housing and valve seating surfaces are about coplanar and define a gap between the inner peripheral edge of the housing seating surface and the outer peripheral edge of the valve seating surface in the closed position of the valve. A seal is provided for sealing the gap between the seating surfaces and preventing flow through the passageway in the closed position of the valve.

The seal has a first portion secured to the housing seating surface on a first side of the rotational axis of the valve and extending across the gap toward the valve seating surface; a second portion secured to the valve seating surface on a second side of the rotational axis and extending across the gap toward the housing seating surface; a first transitional portion coinciding with the rotational axis; and a second transitional portion coinciding with the rotational axis. The seal is unsecured to the valve and the housing in the transitional portions so that the seal may flex in the transitional portions as the valve rotates between the closed position and the open position.

The first and second portions of the seal define a seal plane in the closed position of the valve and the second portion of the seal moves out of the seal plane with the valve as the valve rotates from the closed position to the open position. Preferably, the rotational axis of the valve lies in the seal plane in order to prevent undue distortion of the seal as the valve rotates between the open and closed positions. The seal greatly reduces the torque required to open the valve, regardless of whether the rotational axis of the valve lies in the seal plane, and the seal may be used advantageously with the rotational axis of the valve displaced from the seal plane. Also, the seal may be used independently of the conversion means and release means in virtually any rotatable valve assembly.

It is an advantage of the present invention to provide a rotatable valve assembly which will open at a predictable and repeatable torque magnitude, regardless of the length of time the valve has been in the closed position.

It is an advantage of the present invention to provide a seal for a rotatable valve assembly which allows the valve assembly to be opened at a predictable and repeatable torque magnitude.

It is an advantage of the present invention to provide a pressure relieving rotatable valve assembly which may be reset or restored to a pressure-containing condition without opening the assembly or taking the assembly out of service.

It is an advantage of the present invention to provide a pressure relieving rotatable valve assembly which will automatically reset to a pressure-containing condition without opening the assembly or taking the assembly out of service.

It is an advantage of the present invention to provide such a pressure relieving rotatable valve assembly which reduces the forces the valve must resist and transmit to remain closed.

It is an advantage of the present invention to provide such a pressure relieving rotatable valve assembly which will replace traditional relief valves at a substantial cost savings and using a smaller valve housing.

It is an advantage of the present invention to provide such a pressure relieving rotatable valve assembly in which a large diameter butterfly valve may be used in relatively high pressure applications and using a relatively small rupture pin or magnetic catch to determine the pressure at which the butterfly valve will open.

It is an advantage of the present invention to provide such an assembly which improves the ability of the rotatable valve to be repeatedly reset to the same relieving pressure.

It is an advantage of the present invention to provide such an assembly which allows the valve to be repeatably reset without replacement parts.

BRIEF DESCRIPTION OF THE DRAWINGS

The present invention will be better understood by reference to the example of the following drawings:

FIG. 4 is a schematic left side view of an embodiment of the release means of FIG. 2.

FIG. 5 is a schematic left side view of another embodiment of the release means of FIG. 2.

FIG. 6 is a schematic left side view of another embodiment of the release means of FIG. 2.

FIG. 7 is a schematic left side view of another embodiment of the release means of FIG. 2.

FIG. 10 is a view of FIG. 9 showing the valve in a partially opened position.

FIG. 16 is a schematic side view of an embodiment of the reclosure means of the invention.

FIG. 17 is a schematic side view of another embodiment of the reclosure means of the invention.

FIG. 18 is a schematic side view of another embodiment of the reclosure means of the present invention.

FIG. 19 is a plan view of the reclosure means of FIG. 18.

FIG. 20 is an enlarged, top-sectional view of the release means of FIGS. 1 and 3.

FIG. 21 is a side elevational view of another embodiment of the release means of the present invention.

FIG. 22 is an end elevational view of the release means of FIG. 21.

FIG. 34 is a cross-sectional view of another embodiment of the seal of the present invention.

FIG. 35 is a cross-sectional view of another embodiment of the seal of the present invention.

FIG. 36 is a cross-sectional view of another embodiment of the seal of the present invention.

FIG. 37 is a cross-sectional view of another embodiment of the seal of the present invention.

FIG. 38 is a cross-sectional view of another embodiment of the seal of the present invention.

FIG. 39 is a cross-sectional view of another embodiment of the seal of the present invention.

FIG. 40 is a cross-sectional view of another embodiment of the seal of the present invention.

FIG. 41 is a cross-sectional view of another embodiment of the seal of the present invention.

FIG. 42 is a cross-sectional view of another embodiment of the seal of the present invention.

DESCRIPTION OF THE PREFERRED EMBODIMENTS

Figure 3:
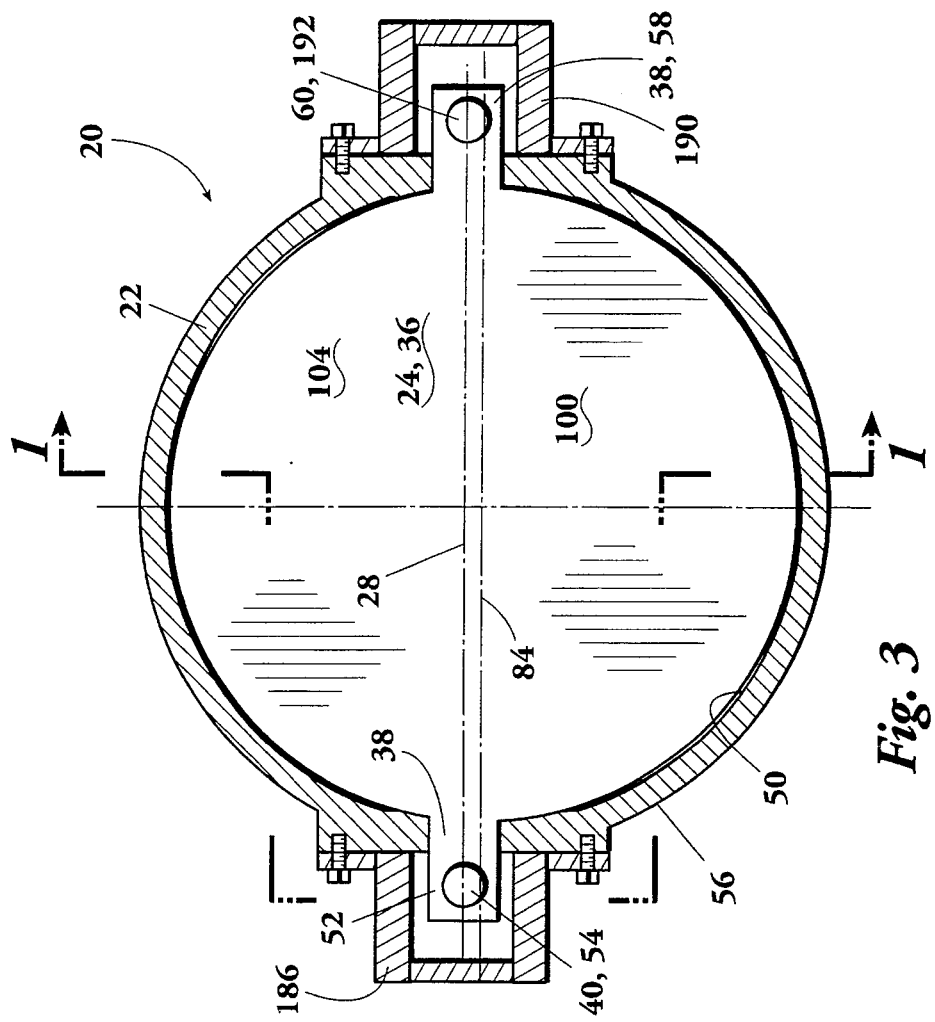
FIG. 3 is a schematic end view of an embodiment of the invention.

Preferred embodiments of the invention will now be described with reference to the drawings. Like reference numerals or characters refer to like or corresponding parts throughout the drawings and the description.

FIGS. 1–43 present embodiments of the rotatable valve assembly, generally designated 20, of the present invention. Although a preferred embodiment of the rotatable valve assembly 20, described herein to facilitate an enabling understanding of the invention, is used as a pressure relieving device which may be used to replace rupture disks, reverse buckling rupture disks, right angle relief valves, and the like, it is intended to be understood that the invention may be adapted to many fluid pressure and flow control applications, as would be known to one skilled in the art in view of the disclosure contained herein.

Figure 1:
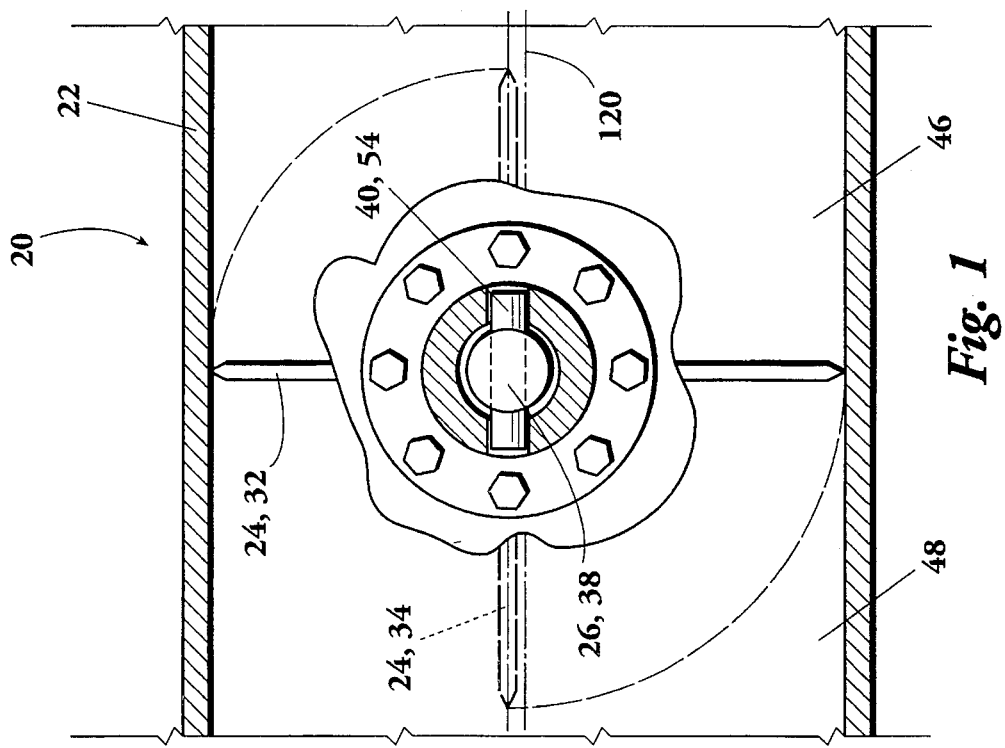
FIG. 1 is a view along line 1—1 of FIG. 3.
Figure 2:
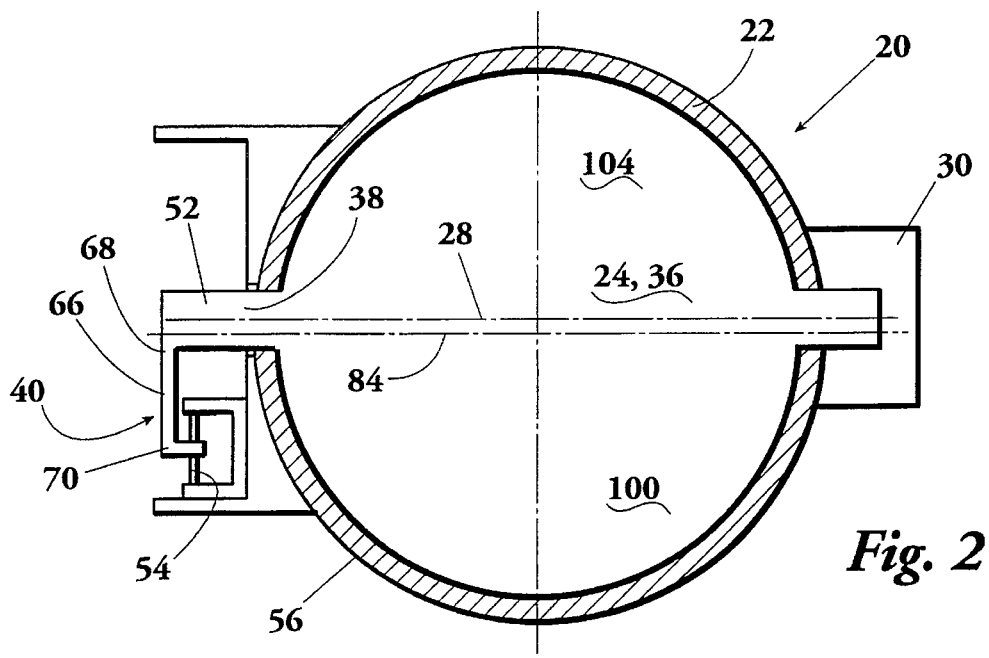
FIG. 2 is a schematic end view of an embodiment of the invention.

Referring to the example of FIGS. 1 and 2, the assembly 20 may be generally described as including a housing 22, a valve 24, mounting means 26 for rotatably mounting the valve 24 in the housing 22 about a rotational axis 28, and power means 30 for rotating the valve 24 between a closed position 32 and an open position 34. In the more preferred embodiments, the power means 30 comprises conversion means 36 for converting fluid pressure in the housing 22 into torque exerted on a shaft 38, and the assembly 20 includes release means 40 located outside the housing 22, for preventing rotation of the shaft 38 and valve 24 from the closed position when the torque exerted on the shaft 38 is below a selected magnitude and for releasing the shaft 38 in order to allow rotation of the shaft 38 and valve 24 to the open position 34 when the torque exerted on the shaft 38 exceeds a selected magnitude.

The housing 22 has an inlet 46 and an outlet 48 defining a fluid passageway 50 through the housing 22. The inlet 46 of the housing 22 receives fluid and pressure from a fluid pressure source (not illustrated), such as a vessel or piping. In the more preferred embodiments, the shaft 38 has an outside end 52 extending through the housing 22 and the shaft 38 is rotatable with the valve 24 about the rotational axis 28.

The preferred release means 40 includes deformable means 54 for making deformable contact between the housing 22 and the shaft 38. The deformable means 54 may be a pin, beam, bar, plate, disk, spring, or comparable rupturable or deformable structure. The deformable means 54 may be a permanently or irreversibly deformable structure, such as a pin or beam which bends or ruptures. In the prototype assembly 20, the deformable means 54 makes deformable contact between the outside 56 of the housing 22 and an outside end 52 of the shaft 38. By outside 56 of the housing 22 is meant an area of the housing 22, or connection therewith, which is not exposed to or in direct operating contact with the fluid contained inside the housing 22; and which may be accessed without opening the housing 22 and exposing the fluid contacting portions of the housing 22 to the outside atmosphere, and without taking the assembly 20 out of service.

Referring to the example of FIG. 3, in one embodiment the mounting means 26 includes a shaft 38 having a second outside end 58 extending through the housing 22; and the release means 40 includes a Second deformable means 60 for making deformable contact between the housing 22 and the shaft 38, as previously discussed. The shaft 38 may be a single, continuous shaft extending across a face of or through the valve 24, or may be one or more shaft ends, axles, ears, or the like which extend from the valve 24 through the housing 22. Limit switches, motion detection switches, or the like may be provided at either or both outside ends 52, 58 of the shaft 38 to indicate whether the valve 24 is open or closed or has been open or closed.

Referring to the example of FIG. 2, the deformable means includes a pin 54, connected between the shaft 38 and the housing 22, which breaks when the torque exerted on the shaft exceeds a selected magnitude. Referring to the example of FIG. 4, in another embodiment, the deformable means 54 includes a pin 54, connected between the housing 22 and the shaft 38, which bends when the torque exerted on the shaft 38 exceeds a selected magnitude. FIG. 4, also exemplifies a pin or spring 54 which is connected between the shaft 38 and housing 22 so that the pin 54 is placed in compression by the torque exerted on the shaft 38. Referring to the example of FIG. 5, the pin or spring 54 is connected between the shaft 38 and housing 22 so that the pin 54 is placed in tension by the torque exerted on the shaft 38. Referring to the example of FIG. 6, the pin 54 is connected between the shaft 38 and the housing 22 so that the pin 54 is subjected to shear forces by the torque exerted on the shaft 38.

FIGS. 2 and 4–7 are simplified, schematic illustrations of example embodiments of the release means 40. In the example of FIGS. 2 and 4–6, the release means 40 includes a contact arm 66 having a first end 68 connected to the outside end 52 of the shaft 38 and a second end 70 extending from the shaft 38; a release support 72 connected to the housing 22; and a pin or spring 54, connected to the release support 72 and obstructing rotation (clockwise in FIGS. 2 and 4–7) of the second end 70 of the contact arm 66. The pin or spring 54 obstructs or prevents rotation of the contact arm 66, shaft 38, and valve 24 from the closed position 32 of the valve until the torque exerted on the shaft 38 exceeds the selected magnitude.

FIGS. 4–7 are simplified, schematic illustrations of additional example embodiments of the release means 40 as seen from the left side of FIG. 2. Referring to the example of FIG. 4, the pin or spring 54 is disposed on the release support 72 so that the pin is subjected to compressive forces by the second end 70 of the contact arm 66. This type of pin 54 is sometimes referred to as a buckling pin or, if it is a spring, a compression spring. The pin or spring 54 should be secured between the release support 72 and the second end 70 of the contact arm 66 so that the contact arm 66 holds the valve 24 solidly in the closed position 32. The pin 54 should also be secured so that when the pin 54 buckles (or the spring compresses), it does not interfere with the clockwise rotation of the contact arm 66 and valve 24 from the closed position to the open position. For example, in the embodiment of FIG. 4, the first end 62 of the pin or spring 54 may be fastened securely to the release support 72 with the second end 64 of the pin simply contacting the second end 70 of the contact arm 66 or being received in a recess 71 in the second end 70 of the contact arm 66 so that the second end 64 of the pin 54 is easily detached from connection with the contact arm 66 when the pin 54 buckles or bends.

Referring to the example of FIG. 5, the pin or spring 54 is connected between the release support 72 and the second end 70 of the contact arm 66 so that the pin is placed in tension by the contact arm 66. This type of pin 54 may be referred to as a tension wire or, if it is a spring, a tension spring. The preferred tension wire or spring 54 has a first end 62 which is secured, such as by clamps, bolts, screws, or the like to the release support 72 and a second end 64 which is secured, such as by clamps, bolts, screws, or the like to the contact arm 66. Alternatively, a perforation or hole may be made in the contact arm 66 and/or release support 72, the perforation being large enough to pass the tension wire with the appropriate end(s) of the tension wire being enlarged or fastened so that it will not pass through the perforation when the wire is placed in tension. Referring to FIG. 5, as the valve and contact arm 66 rotate clockwise from the closed position to the open position, the wire or spring 54 is placed in tension until the torque exerted on the valve 24 and wire 54 exceeds the selected rupture pressure of the tension wire 54 or the restraining force of the tension spring. As in the other embodiments of the release means 40, the tension wire or spring 54 should be connected between the contact arm 66 and release support 72 in such a manner that the valve 24 is held securely in a closed position.

Referring to the example of FIG. 6, in another embodiment, the pin 54 is disposed on the release support 72 so as to be subjected to shear forces by the second end 70 of the contact arm 66. In the example of FIG. 6, the shear pin 54 is securely fastened to the release support 72 and extends upwardly therefrom. The second end 70 of the contact arm 66 has an extension 73 which extends into contact with the pin 54 adjacent the connecting point of the pin 54 to the release support 72 so as to exert a shearing force on the pin 54 at its connection to the release support 72. As in the other embodiments of the release means 40, the relative positioning of the shear pin 54 and contact arm extension 73 should be adjustable and adjusted to hold the valve 24 securely in the closed position until the torque exerted on the valve exceeds the selected magnitude at which the pin 54 should shear and the valve should open.

Referring to the example of FIG. 7, in a more preferred embodiment, the release means 40 includes a magnetic catch 74. The magnetic catch 74 has a first magnetic element 76 located on the second end 70 of the contact arm 66 and a second magnetic element 78 located on the release support 72. The first and second magnetic elements 76, 78 are oriented so that their magnetic attraction holds the contact arm 66 and valve 24 in the closed position until the torque exerted on the valve 24 and shaft 38 exceeds the selected magnitude. The first and second magnetic elements 76, 78 may be permanent magnets or electro-magnets, although permanent magnets are preferred. One of the first and second magnetic elements 76, 78 may be a non-magnetized material which is attracted to the magnetization of the other elements 76, 78, such as a ferro-magnetic metal. As in the other embodiments of the release means 40, the location of the first and second magnetic elements 76, 78 should be adjustable so that the valve 24 is held securely in the closed position in order to prevent leakage of fluid around the valve and to prevent movement and/or chattering of the valve in the housing 22. The magnetic strengths of the magnetic elements 76, 78 should be selected to hold the valve in the closed position until the torque exerted on the valve 24, shaft 38, and contact arm 66 exceeds the selected magnitude. The magnetic catch 74 provides a repeatable release means 40 which allows the valve 24 to be restored to the closed position without replacement parts and which may be used many times without losing any accuracy in the amount of torque or fluid pressure required to move the valve 24 from the closed position to the open position.

Referring to the example of FIGS. 2 and 3, in the prototype assembly 20, which is a pressure relieving device, the conversion means 36 is provided by the valve 24 and the mounting means 26 is provided by the shaft 38. The preferred conversion means 36 applies greater force of the fluid pressure to the valve 24 on one side of the rotational axis 28 of the shaft 38. The conversion means 36 may be any valve placement, valve shape, valve seat shape or structure, housing shape or structure, fluid passageway 50 shape or structure, or the like, which applies the fluid pressure in the housing inlet 46 to the valve 24 in such a manner as to create a moment or torque about the rotational axis 28 of the valve 24 and/or shaft 38. In the prototype assembly 20, this is accomplished by using a butterfly or disk valve 24 and mounting the valve 24 for eccentric rotation in the passageway 50. The rotational axis 28 of the shaft 38 and valve 24 is offset from the diameter 84 of the valve 24. The portion of the valve 24 on the first side 100 of the rotational axis 38 is larger and has greater area exposed to the inlet fluid pressure than the portion of the valve 24 on the second side 104 of the rotational axis 28. This creates a moment and torque about the rotational axis 28 and shaft 38. This arrangement has another advantage in that the shaft 38 partially balances the fluid pressure on either side of the rotational axis 28 and shaft 38 and therefore reduces the pressure which the valve 24 must directly resist to seal, thereby reducing the chatter or simmer experienced in some types of pressure relieving valves, such as right angle relief valves.

Referring to example FIGS. 8–15, a more preferred embodiment of the rotatable valve assembly 20 will now be discussed. Referring to the example of FIGS. 13 and 14, the housing 22 includes a seating surface 86 having an inner peripheral edge 88 extending around the passageway 50. In the prototype housing 22, the housing seating surface 86 is a continuous, annular ledge or shelf extending around the fluid passageway 50 at the juncture of the inlet 46 and outlet 48. The valve 24 has a seating surface 90 with an outer peripheral edge 92 extending around the valve 24. In the closed position 32, the housing and valve seating surfaces 86, 90 are about coplanar and define a gap 94 between the inner peripheral edge 88 of the housing seating surface 86 and the outer peripheral edge 92 of the valve seating surface 90. In the open position 34 of the valve 24, and when the valve 24 is in other positions than the closed position 32, the housing and valve seating surfaces 86, 90 are not coplanar, as best seen in FIG. 10. Preferably, the housing seating surface 86 and valve seating surface 90 are on the inlet side of the housing and valve. They may be located on the outlet side.

Figure 11:
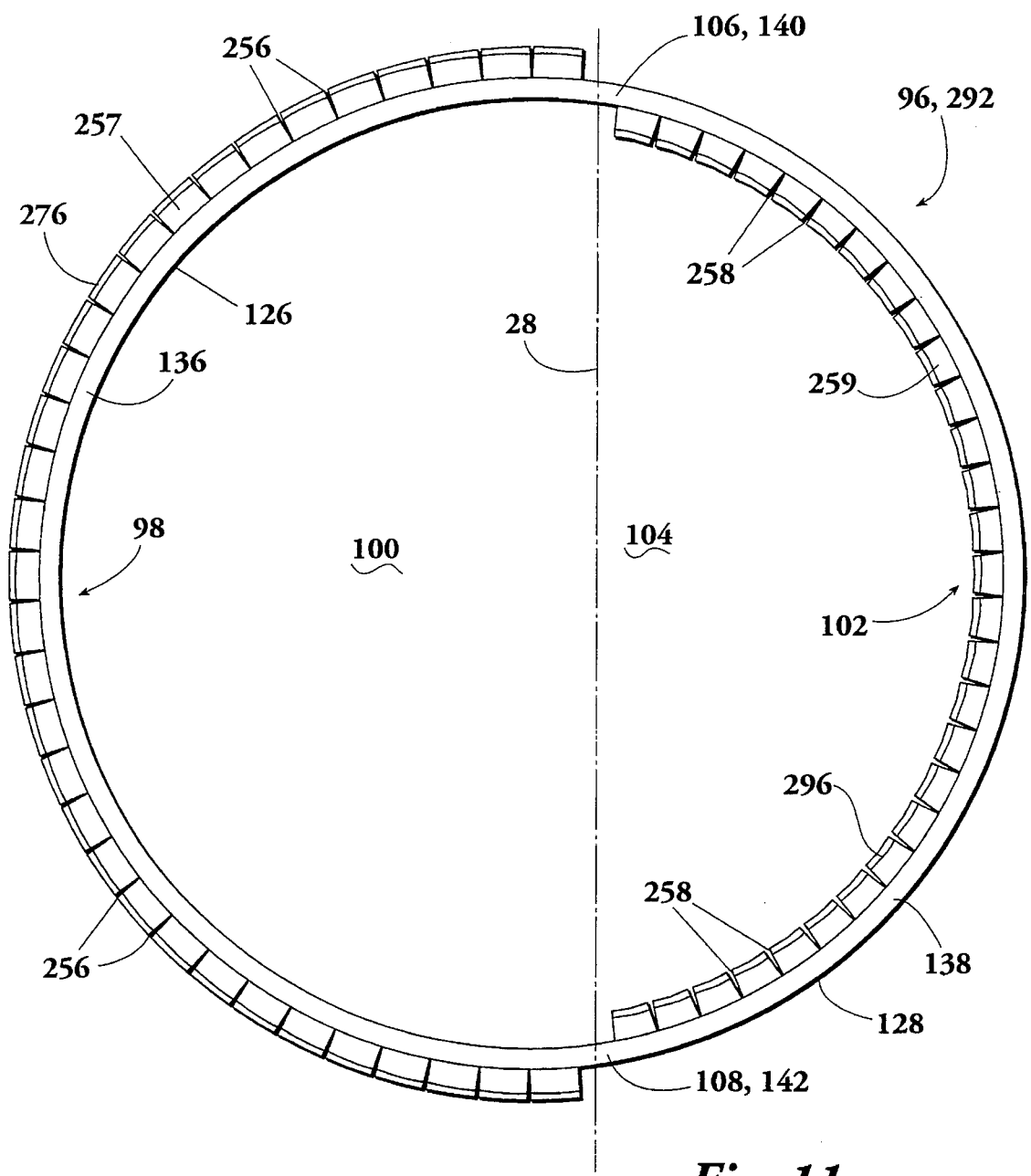
FIG. 11 is an elevational view of the inlet face of an embodiment of the seal of the present invention.

The assembly 20 includes a seal 96 for sealing the gap 94 between the seating surfaces 86, 90 and preventing fluid flow through the valve 24 and passageway 50 in the closed position 32 of the valve 24. The preferred seal 96 has a first portion 98 secured to the housing seating surface 86 on a first side 100 of the rotational axis 28 and extending across the gap 94 toward the valve seating surface 90; a second portion 102 secured to the valve seating surface 90 on a second side 104 of the rotational axis 28 and extending across the gap 94 toward the housing seating surface 86; a first transitional portion 106 coinciding with the rotational axis 28 (FIG. 11); and a second transitional portion 108 coinciding with the rotational axis (FIG. 11).

Figure 12:
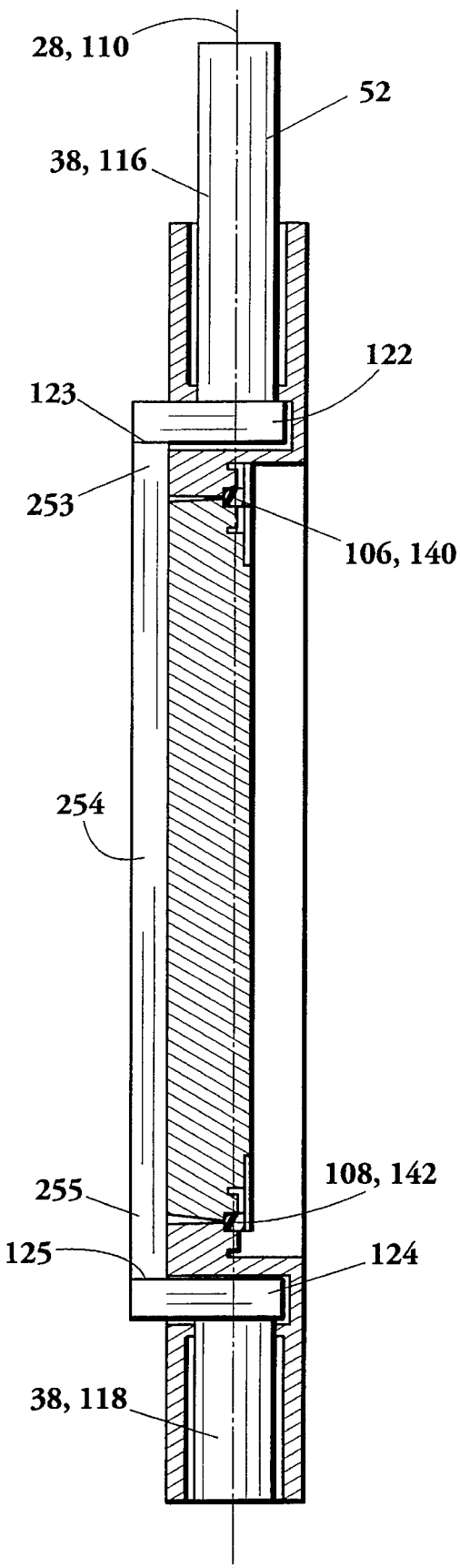
FIG. 12 is a view along line 12—12 of FIG. 8.

Referring to FIG. 12, the seal 96 is unsecured to the housing 22 and valve 24 in the transitional portions 106, 108 so that the seal may flex or move in the transitional portions 106, 108 as the valve 24 rotates between the closed position 32 and the open position 34. In the preferred assembly 20, the first and second portions 98, 102 of the seal 96 define a seal plane 110 in the closed position 32 of the valve, and the second portion 102 of the seal 96 moves or rotates out of the seal plane 110 with the valve 24 and valve seating surface 90 as the valve 24 rotates from the closed position 32 to the open position 34, as best seen in FIGS. 9 and 10.

Figure 9:
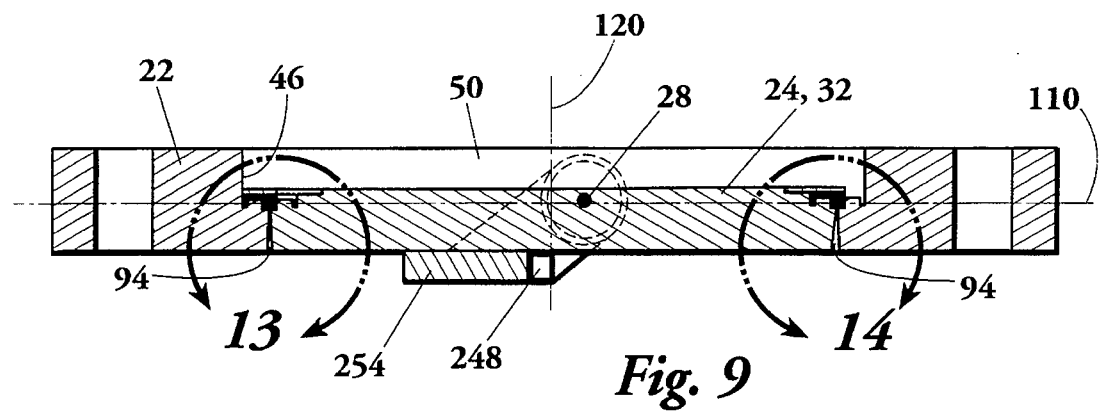
FIG. 9 is a view along line 9—9 of FIG. 8.

Referring to the example of FIGS. 9, 10, and 12, in the more preferred embodiment of the assembly 20, the rotational axis 28 of the valve 24 lies in the seal plane 110. By positioning the rotational axis 28 in the seal plane 110, the valve 24 is allowed to rotate without stretching the seal 96 (as would occur if the rotational axis was inside the angle created by the rotating seal second portion 102 with the seal plane 110) or causing the seal to bulge or push out of the gap 94 (as would occur if the rotational axis was outside of the angle created by the rotating seal second portion 102 with the seal plane 110). If it is desired to reduce stretching, binding, or bunching of the seal 96 as much as possible, the rotational axis 28 should be aligned as closely as possible with the optimum position of the seal plane 110.

Figure 32:
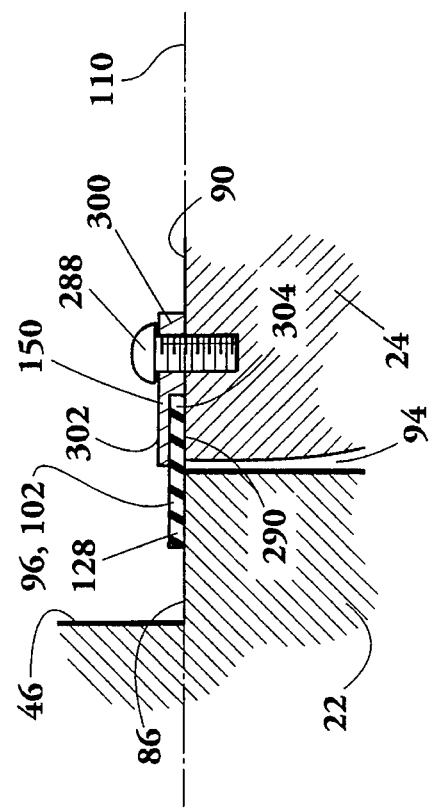
FIGS. 32 is a cross-sectional view of another embodiment of the seal of the present invention.
Figure 33:
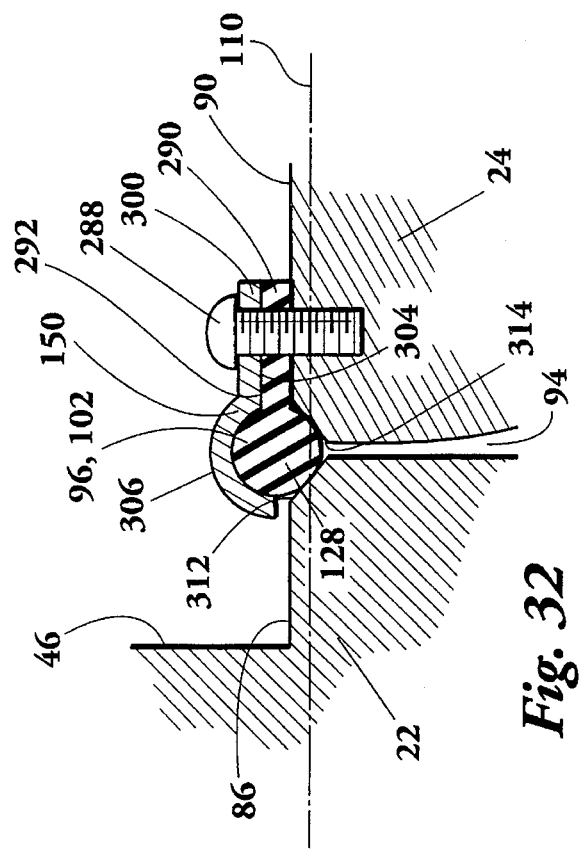
FIG. 33 is a cross-sectional view of another embodiment of the seal of the present invention.

As exemplified in FIGS. 13, 14, and 30–42, the optimum position of the seal plane 110 for reducing distortion of the seal will vary depending upon the thickness of the seal 96, the shape of the seal 96, and the shape of the housing and valve seating surfaces 86, 90. For example, in the embodiment of FIGS. 13, 14, and 38, it is contemplated that the optimum position of the seal plane 110 passes through the seal 96 at a position corresponding with approximately one-half the vertical or axial dimension of the notches 130, 132 and groove 134. In the embodiments of FIGS. 30, 34, 35, 36, 37, 39, and 40, it is contemplated that optimum position of the seal plane 110 should be visualized as being coplanar with the housing and valve seating surfaces 86, 90. In the embodiments of FIGS. 31, 32, and 33, it is contemplated that the optimum position of the seal plane 110 will pass through the seal at a position approximately one-half of the vertical or axial dimension of the groove created by the beveled, adjacent edges 312, 314 of the valve and housing seating surfaces 86, 90. In the embodiment of FIG. 41, it is contemplated that the optimum position of the seal plane 110 will pass through a position corresponding with about one-half the vertical or axial dimension of the notches 334, 340. In the embodiment of FIG. 42, it is contemplated that optimum position of the seal plane 110 will pass through a position corresponding with approximately one-half the vertical or axial dimension of the grooves 346, 348.

Figure 8:
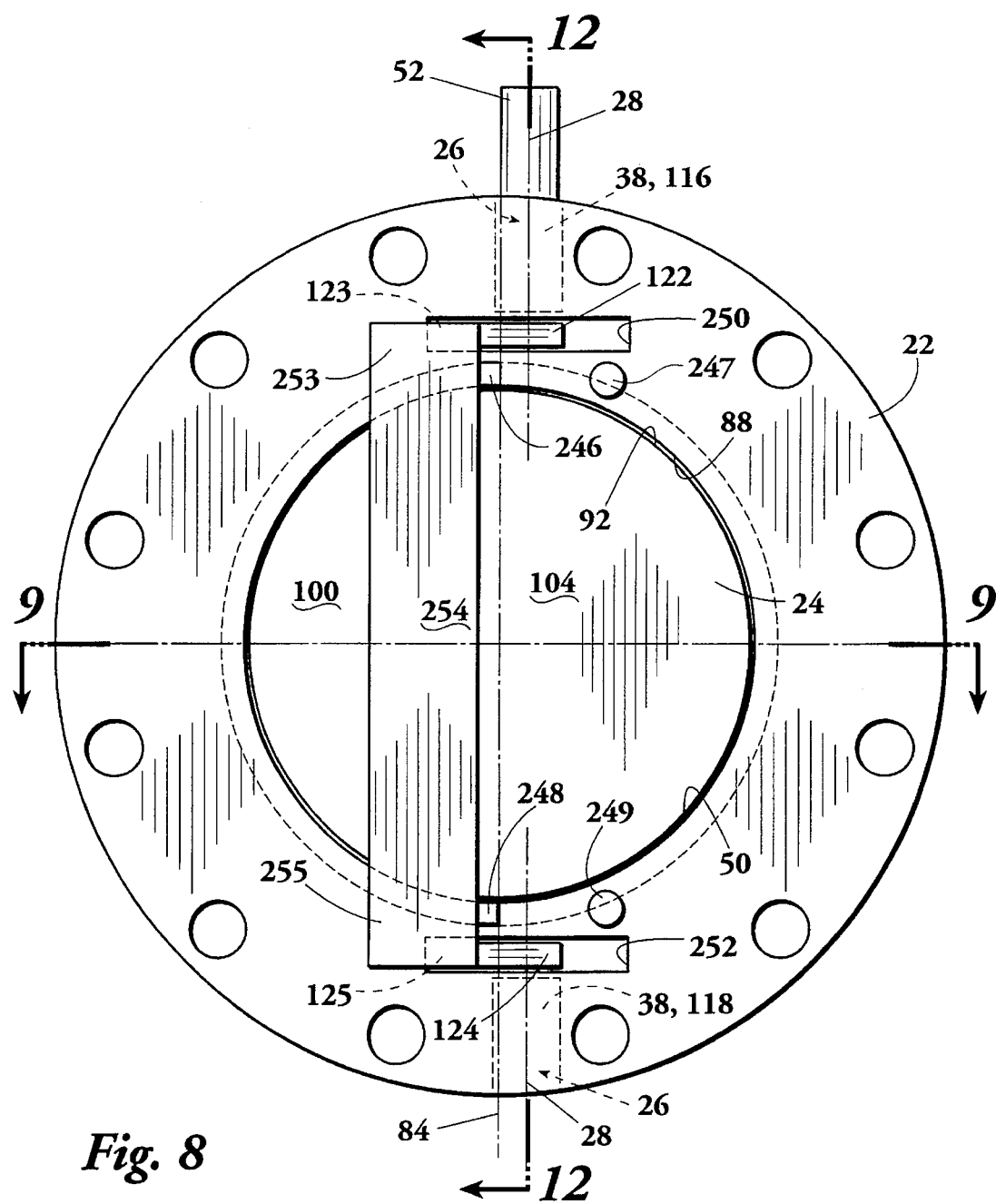
FIG. 8 is an elevational end view of the rotatable valve assembly of the present invention.

Referring to FIG. 8, in the prototype assembly 20, this positioning of the rotational axis 28 is accomplished by constructing the mounting means 26 such that the shaft 38 has a first shaft end 116 rotatably disposed in the housing 22 for rotatably connecting the valve 24 to the housing 22 and a second shaft end 118 rotatably disposed in the housing 22 for rotatably connecting the valve 24 to the housing 22, with the rotational axis 28 being created and defined by the rotatable connections of the first and second shaft ends 116, 118 with the housing 22. The connections of the shaft 38 and shaft ends 116, 118, to the valve 24 are offset axially (axially along the flow axis 120 through the fluid passageway 50) from the seal plane 110 so that the connections of the shaft 38 and/or shaft ends 116, 118 to the valve 24 do not physically obstruct or interfere with the gap 94 or seal 96. This may be accomplished by relieving or cutting out the shaft ends 116, 118 where their connection to the valve 24 coincides with the gap 94 and seal 96. In the prototype apparatus, a first offset bracket 122 is connected between the first shaft end 116 and the valve 24 such that the joining 123 of the first offset bracket 122 to the valve 24 is offset from the rotational axis; and a second offset bracket 124 is connected between the second shaft end 118 and the valve 24 such that the joining 125 of the second offset bracket 124 to the valve 24 is offset from the rotational axis, as will be discussed in greater detail below.

Figure 13:
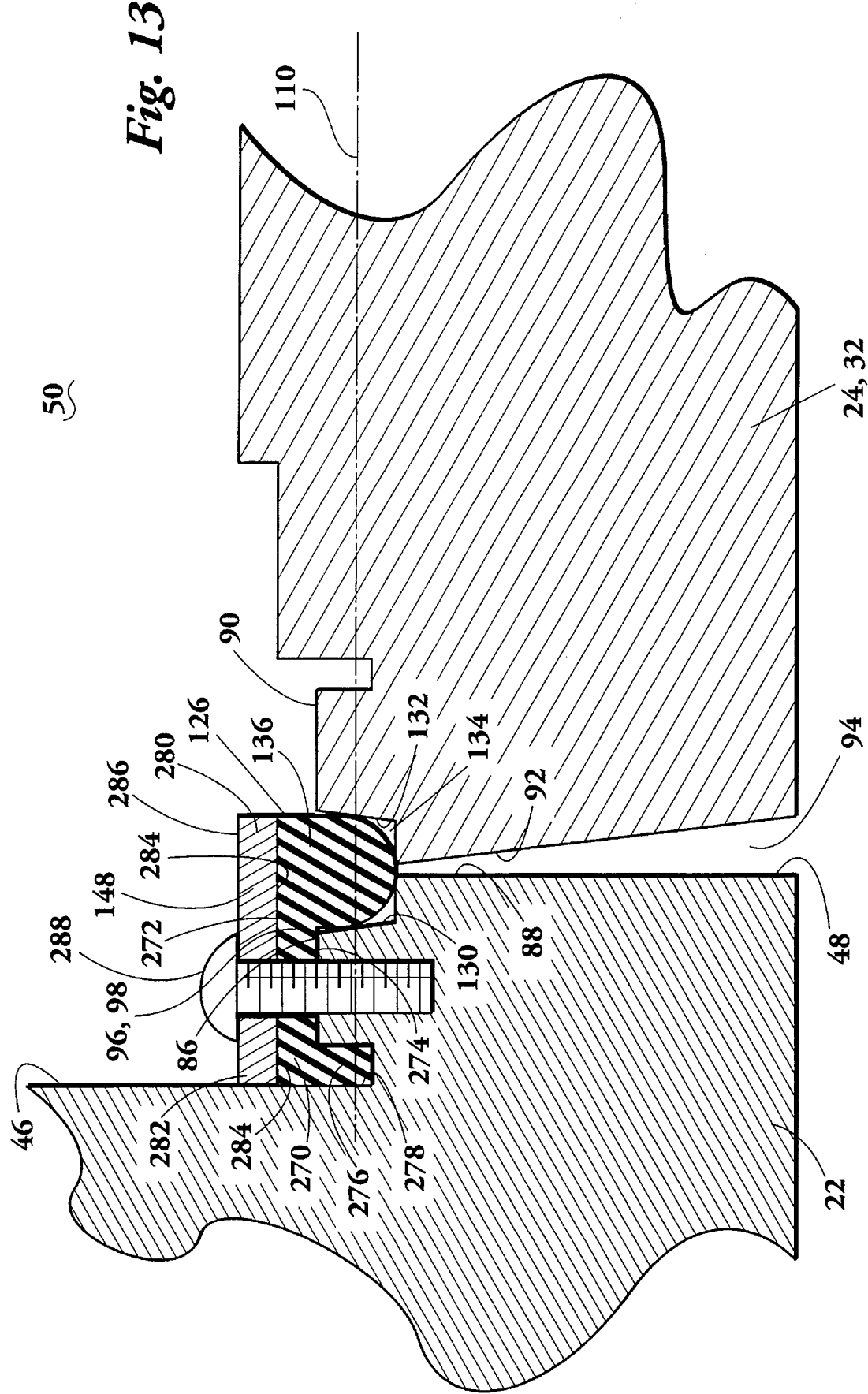
FIG. 13 is an enlarged detail view of the first portion of the seal with the valve in the closed position, as indicated on FIG. 9.
Figure 14:
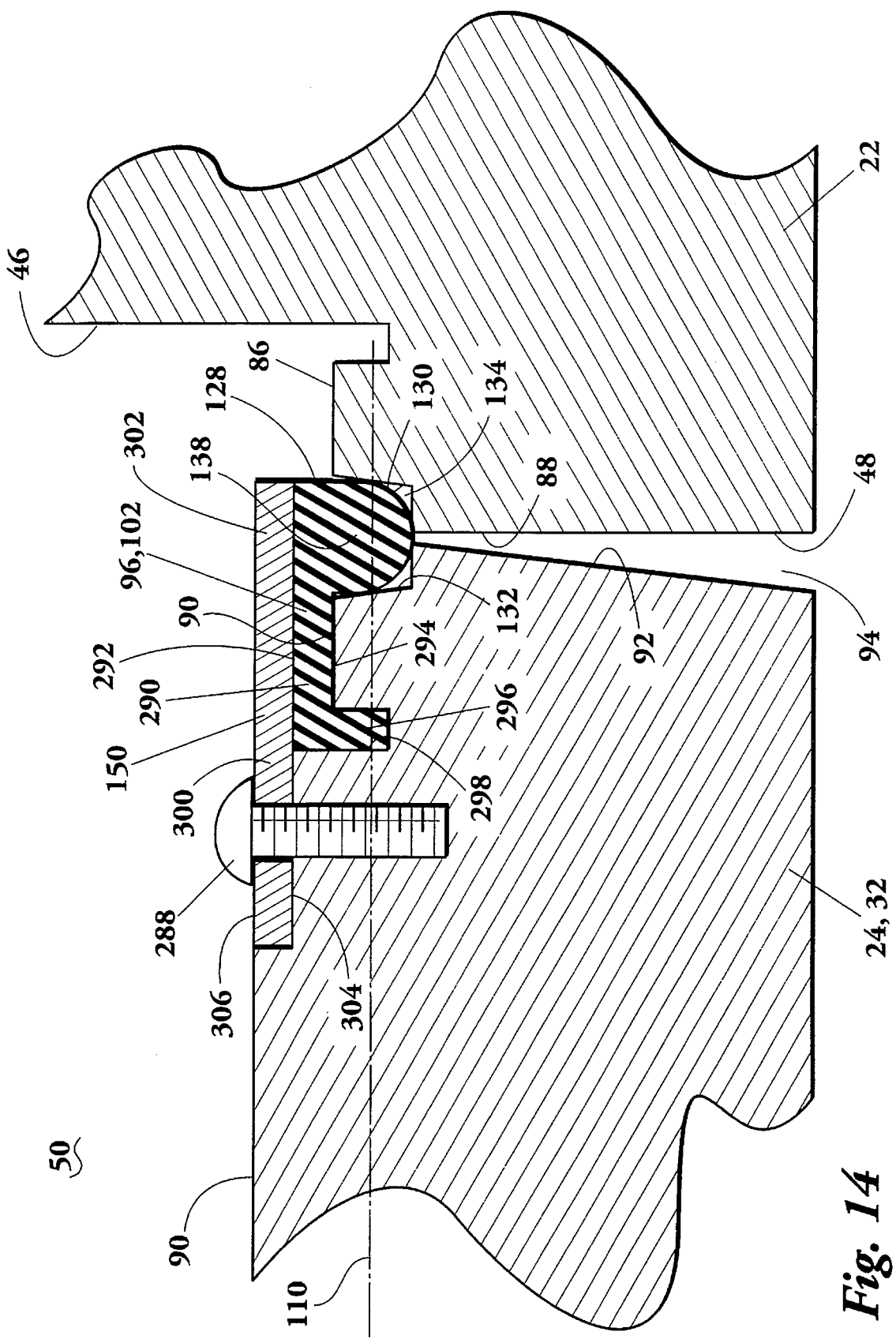
FIG. 14 is an enlarged detail view of the second portion of the seal with the valve in the closed position, as indicated on FIG. 9.

Referring to the example of FIGS. 13 and 14, in a preferred embodiment, the first portion 98 of the seal 96 includes an inside rim 126 extending across the gap 94 and contacting the valve seating surface 90 in the closed position 32 of the valve 24, and the second portion 102 of the seal 96 includes an outside rim 128 extending across the gap 94 and contacting the housing seating surface 86 in the closed position 32 of the valve 24. The first and second transitional portions 106, 108 of the seal 96 also extend across the gap 94 and sealingly contact the housing and valve seating surfaces 86, 90 in the closed position of the valve 24. Referring to the example of FIGS. 13 and 14, in the preferred embodiment, the inner peripheral edge 88 of the housing seating surface 86 has a notch 130 extending around the inner peripheral edge 88, the outer peripheral edge 92 of the valve seating surface 90 has a notch 132 extending around the outer peripheral edge 92, and the notches form or create a groove 134 coinciding with the gap 94 between the seating surfaces 86, 90 in the closed position 32 of the valve 24. Preferably, the inside rim 126 of the first portion 98 of the seal 96 has a protuberance 136 extending into the notch 130 in the inner peripheral edge 88 of the housing seating surface 86 and extending across the groove 134 into sealing contact with the valve seating surface 90 in a closed position 32 of the valve 24. The preferred outside rim 128 of the second portion 102 of the seal 96 has a protuberance 138 extending into the notch 132 in the outer peripheral edge 92 of the valve seating surface 90 and extending across the groove 134 into sealing contact with the housing seating surface 86 in the closed position 32 of the valve 24.

Referring to FIGS. 11 and 12, preferably, the first transitional portion 106 of the seal 96 has a protuberance 140 and the second transitional portion 108 has a protuberance 142 extending into the groove 134. The protuberances 140, 142 make sealing contact with the notches 130, 132 in the housing and valve seating surface 86, 90 in the closed position 32 of the valve 24. In the preferred embodiment of the seal 96, the inside rim protuberance 136, outside rim protuberance 138, and transitional portion protuberances 140, 142 form an endless or continuous protuberance extending around the valve 24 and seal 96. In the prototype assembly 20, the inside rim protuberance 136 remains in the notch 130 in the inner peripheral edge 88 of the housing seating surface 86 in all positions of the valve 24 and the outside rim protuberance 138 remains in the notch 132 in the outer peripheral edge 92 of the valve seating surface 90 in all positions of the valve.

Figure 15:
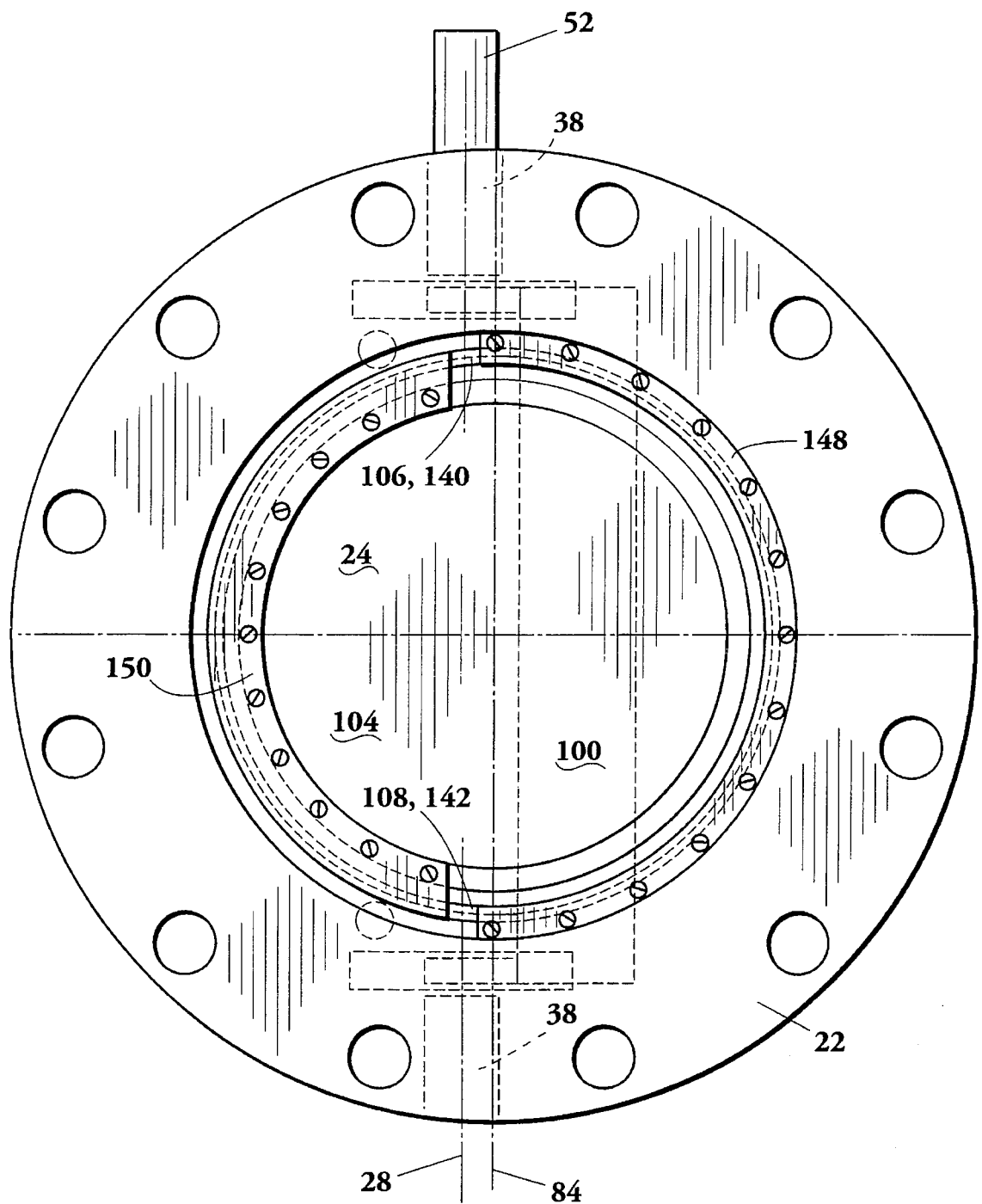
FIG. 15 is a rear elevational view of FIG. 8.

Referring to the example of FIGS. 13–15, in the prototype assembly 20, the first portion 98 of the seal 96 includes a housing retainer 148, connected to the housing 22 and the first portion 98 of the seal 96, for securing the first portion 98 of the seal 96 to the housing (FIG. 13); the second portion 102 of the seal 96 includes a valve retainer 150, connected to the valve 24 and the second portion 102 of the seal 96, for securing the second portion 102 of the seal 96 to the valve 24 (FIG. 14), and the seal 96 is unsecured in the transitional portions 106, 108 (FIG. 15). Preferably, the housing retainer 148 extends across the gap 94 with the first portion 98 of the seal 96 connected to the housing retainer 148. The seal 96 is disposed between the housing retainer 148 and the gap 94 and the housing retainer 148 biases or urges the first portion 98 of the seal 96 into sealing contact with the housing and valve seating surfaces 86, 90 in the closed position 32 of the valve 24. The valve retainer 150 extends across the gap 94 with the second portion 102 of the seal 96 connected to the valve retainer 150 and disposed between the valve retainer 150 and the gap 94. The valve retainer 150 biases or urges the second portion 102 of the seal 96 into sealing contact with the housing and valve seating surfaces 86, 90 in the closed position 32 of the valve 24. The housing retainer 148 does not contact the valve 24. The valve retainer does not contact the housing 22.

Additional example embodiments of the seal 96 are discussed in greater detail below. The use of the seal 96 and housing and valve seating surfaces 86, 90 discussed above creates a rotatable valve assembly 20 in which neither the housing 22 nor the valve 24 continuously wipes or drags against a seal as the valve is rotated. This greatly reduces the frictional forces which must be overcome to rotate the valve 24 and also creates a rotatable valve assembly 20 in which the torque required to initiate rotation of the valve assembly does not increase as the valve is left in a closed position for extended periods of time. The previously described seal 96, housing seating surface 86, and valve seating surface 90 may be incorporated into virtually type of rotatable valve assembly in which it is desired to reduce the frictional forces required to open, close, or rotate the valve; and may be used without the conversion means 36 and with other types of power means 30, such as manual, hydraulic, pneumatic, and electric valve actuators. In situations where it is acceptable for the seal 96 to stretch into or to bulge away from the seating surfaces 86, 90 in the transitional portions 98, 102, the rotational axis 28 may be displaced from the seal plane 110.

Referring to the example of FIGS. 16–19, the assembly 20 may also include reclosure means 152, located outside the housing 22, for returning the valve 24 to the closed position 32 after the valve 24 has been opened. The reclosure means 152 is particularly useful where the assembly 20 is used as a pressure relieving device, in that, after the excessive pressure has been relieved, the reclosure means 152 will automatically return the valve 24 to the closed position 32. It is contemplated that the assembly 20 and reclosure means 152 will be particularly useful with the release means 40 having a magnetic catch 74 (FIGS. 7 and 25), in that the reclosure means 152 will automatically, without the aid of a human operator, reset the magnetic catch 74 and valve 24 to the closed position until another overpressure condition exerts torque about the rotational axis 28 and shaft 38 which exceeds the selected magnitude required to open the magnetic catch 74.

The reclosure means 152 may be any form of spring-loaded actuator, pneumatically-operated actuator, electrically-operated actuator, hydraulically-operated actuator, or weight-biased actuator. The strength of the reclosure means 152 should be selected, in view of the torque or fluid pressure at which the release means 40 is designed to allow the valve 24 to open, to reclose the valve 24 without interfering with the pressure relieving design or capability of the valve 24, as would be known to one skilled in the art in view of the disclosure contained herein. The reclosure means 152 may be located at the same shaft end 52, 58 as the release means 40 or at the opposite outside shaft end.

Referring to the example of FIG. 16, in one embodiment, the reclosure means 152 comprises a torsion spring 154 connected between the outside end 52 of the shaft 38 and a torsion spring housing 156 connected to the outside of the housing 22 adjacent the shaft 38.

Referring to the example of FIG. 17, in another embodiment, the reclosure means 152 includes a first magnetic element 158 having north (N) and south (S) magnetic poles disposed in the outside end 52 of the shaft 38. A second magnetic element 160 having north (N) and south (S) magnetic poles is disposed in the housing 22 or in a magnet housing 162 extending from the outside of the housing 22 adjacent the shaft 38. The first and second magnetic elements may be electromagnets or the like, but are permanent magnets in the preferred embodiment. The first and second magnetic elements 158, 160 are oriented so that like magnetic poles of the first and second magnetic elements 158, 160 bias the shaft 38 and valve 24 from the open position 34 to the closed position 32 after the overpressure and torque forcing the valve 24 from the closed position to the open position has subsided.

Referring to the example of FIGS. 18 and 19, in another embodiment, the reclosure means 152 includes a reclosure arm 164 connected to and extending from the outside end 52 of the shaft 38. A counterweight 166 is connected to the reclosure arm 164 for urging the shaft 38 and valve 24 from the open position 34 to the closed position 32. Preferably, the reclosure arm 164 is connected to the outside end 52 of the shaft 38 with a counterweight housing 168. The preferred counterweight housing 168 is rotationally positionable on the shaft end 52. For example, as illustrated in FIG. 19, the counterweight housing 168 may be a cylindrically shaped extension which fits over the outside end 52 of the shaft 38 and has a set screw 170, or other fastening device, for selectably securing the position of the counterweight housing 168 on the shaft end 52. The set screw 170 may be loosened and the housing 168 rotated with respect to the shaft end 52 in order to adjust the orientation of the reclosure arm 164 and counterweight 166 with respect to the housing 22 and valve 24. The preferred reclosure arm 164 is adjustably connected to the counterweight housing 168 so that the distance from the rotational axis 28 of the shaft 38 to the counterweight 166 may be adjusted in order to adjust the magnitude of the force or torque the counterweight 166 exerts in biasing the valve 24 towards the closed position 32. In the example FIG. 19, the reclosure arm 164 extends through a slot or other transverse (to the rotational axis 28) passageway 172 through the housing 168 and a second set screw 174 is adjustably extendable through the housing 168 into contact with the reclosure arm 164 to secure the arm 164 in a selected position. Preferably, the counterweight 166 is detachable from the reclosure arm 164 so that various sizes or weights of counterweights 166 may be used to adjust the force or torque with which the reclosure arm 164 biases the valve 24 from the open position 34 towards the closed position 32.

To enable a better understanding of the invention, elements, components, and additional embodiments of the assembly 20 will now be described in greater detail. Referring to the example of FIG. 20, the release means 40 includes a pin or beam 54 connected between the shaft 38 and the housing 22 and having an unsupported area 180 extending between the shaft 38 and the housing 22. The unsupported area 180 reduces the torque or force magnitude required to deform or rupture the pin 54 to a magnitude below the torque or force magnitude required to shear the pin 54. It is contemplated that the predictability of the force required to rupture the pin 54 becomes more accurate or reliable as the length of the unsupported area 180 increases.

The pin 54 extends about diametrically through a hole 184 in the outside end 52 of the shaft 38. A support housing 186 is connected to the housing 22 around the outside end 52 of the shaft 38. The support housing 186 includes a slot or hole 188 which may be aligned with at least one end of the pin 54 so that an end of the pin 54 may be extended through both the shaft 38 and support housing 186 in order to lock or secure the valve 24 in the closed position 32. The pin 54 and the unsupported area 180 between the outside end of the shaft 38 and the adjacent support housing 186 should be selected or sized so that the pin 54 will rupture when a preselected magnitude of torque is applied to the valve 24 and shaft 38. The support housing 186 and pin 54 may be designed so that the pin 54 passes through the shaft and through the support housing 186 on both sides of the shaft 38, as illustrated in FIG. 20, if it is desired to increase the torque required to rupture the pin 54. Also, a second support housing 190 may be provided at the second outside end 58 of the shaft 38 and provision made for providing pins 54, 192 at both ends 52, 58 of the shaft 38 if it is desired to further increase the torque required the shaft 38 and valve 24 from the closed position 32 (FIG. 3). The relative positioning of the support housing(s) 186, 190 and slot(s) 184,188 should be adjustable to ensure snug engagement of the pin 54 in the slot(s) and to thereby securely hold the valve 24 in the closed position 32 at torques below the desired rupture torque, as would be known to one skilled in the art in view of disclosure contained herein.

Referring to the example of FIGS. 21 and 22, in another prototype embodiment of the release means 40, the release support 72 includes a frame 194 connected to the outside 56 of the housing 22. A deformable or rupturable pin 54 is mounted on the release support 72 at a point spaced away from the rotational axis 28 of the valve 24. A contact arm 66 has a first end 68 connected to the outside end 52 of the shaft 38 and a second end 70 which extends away from the shaft end 58 and contacts the pin 54 at a deformation initiation point 182. In the prototype assembly 20, the pin 54 is simply supported, i.e., the first and second ends 196, 198 of the pin 54 are supported with the deformation initiation point 182 and the remainder of the pin 54 being unsupported. The pin 54 and the distance between the supported ends 196, 198 of the pins should be selected or sized to rupture or deform when the selected torque exists on the shaft 38 and arm 66. The placement of the release support 72 and distance of the deformation initiation point 182 from the rotational axis 28, and the length of arm 60 may also be sized or selected in conjunction with the strength of the pin 54 to allow the valve 24 and shaft 38 to rotate when the fluid pressure exerts a predetermined magnitude of torque on the valve 24 and shaft 38. A second release support, second contact arm, etc. may be provided at the second outside end 58 of the shaft 28 (not illustrated) if desired or necessary for a specific application, as would be known to one skilled in the art in view of the disclosure contained herein.

Figure 23:
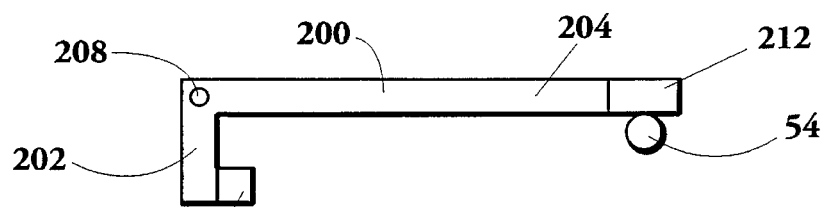
FIG. 23 is a top plan view of the lever arm of FIGS. 21 and 22.
Figure 24:
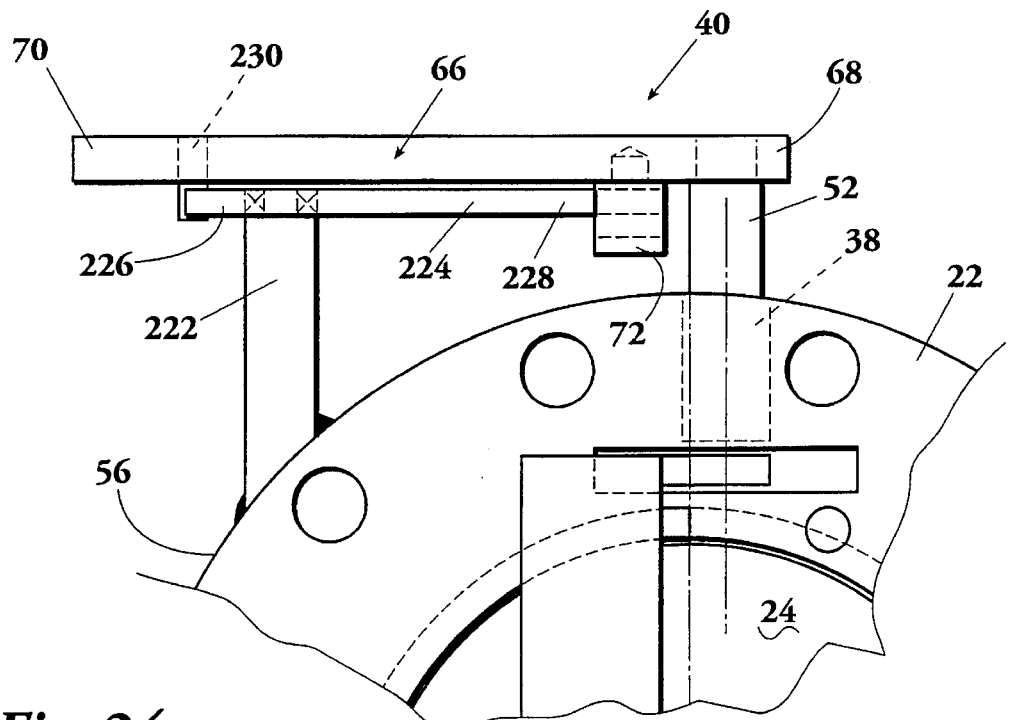
FIG. 24 is a front elevational view of another embodiment of the release means of the invention.

In the prototype embodiment, referring to the example of FIGS. 21–23, the second end 70 of the arm 66 contacts a lever arm 200 which extends between the contact arm 66 and pin 54 in order to further increase the mechanical advantage at the location of the pin 54 and reduce the strength of the pin 54 necessary to hold the valve 24 in the closed position 32. This is particularly useful when the assembly 20 is to be used in high pressure applications. Although the lever arm 200 may take various shapes and configurations to adapt to a specific situation, as will be known to one skilled in the art in view of the disclosure contained herein, and as further discussed below, in the prototype assembly 20 of FIGS. 21–23, the lever arm 200 is generally L-shaped. The lever arm 200 has a short leg 202 which contacts the arm 66 and a long leg 204 which extends perpendicularly from the short leg 202 into contact with the pin 54. The release support 72 includes a position adjustment mechanism 206, such as a set screw, threaded bolt, or the like, for adjusting the position of pin 54 and the engagement between the pin 54 and lever arm 200. The pin's position should be adjusted so that the valve 24 is held sealingly engaged with the housing 22 until the torque about shaft 38 exceeds the desired rupture torque at which the valve 24 is to open.

A hinge pin 208 extends through juncture of the short and long legs 202, 204 and creates an axis of rotation of the lever arm 200 which is about perpendicular to the plane of the lever arm 200. The hinge pin 208 has receptacle 210 (FIG. 21) which connects the hinge pin 208 to the outside of the housing 22. In the prototype lever arm 200, the free end 212 of the long leg 204 has a pointed, knife-like edge which contacts the pin 54 at the deformation initiation point 182 (FIG. 23). As previously mentioned, the pin 54 may be selected to rupture or to deform (i.e., bend) when subjected to a preselected force, thereby freeing the arm 66 and allowing the arm 66, shaft 38, and valve 24 to rotate to the open position 34 of the valve 24. In the prototype assembly 20, a handle 214 is provided for lifting or carrying the assembly 20, as the assembly 20 may be large and heavy. As indicated in FIG. 22, replacement pins 216 may be stored in the handle 214.

FIGS. 24–28 exemplify a more preferred embodiment of the release means 40, which does not require a housing 22 as large as the previously discussed embodiments, particularly along the flow axis 120. In the embodiments of FIGS. 24–28, the contact arm 66 has a first end 68 connected to the outside end 52 of the shaft 38 and a second end 70 extending therefrom. The release means 40 includes stanchion 222 extending from the outside 56 of the housing 22. Lever arm 224 is pivotably connected to the stanchion 222 so that the lever arm 224 will pivot in a plane about parallel with the pivotal plane of the contact arm 66, the pivotal plane of the lever arm 224 being closer to the housing 22 so that the lever arm 224 is free to pivot between the contact arm 66 and the housing 22. The lever arm 224 has a first end 226 extending away from the stanchion and shaft 38 and a second end 228 extending from the stanchion 222 toward the shaft 38, the distance from the stanchion 222 to the second end 228 being greater than the distance to the first end 226. A post 230 extends from one of the second end 70 of the contact arm 66 or the first end 226 of the lever arm 224 into contact with the other (in the prototype assembly 20 the post is fixedly attached to the second end 70 of the contact arm 66). A release support 72 is connected to the housing 22 through the contact arm 66 and shaft 38, i.e., the release support 72 is connected to the contact arm 66 near the first end 68 of the contact arm 66 and between the shaft 38 and the stanchion 222, such that the release support 72 is in the rotational path of the second end 228 of the lever arm 224. As the shaft rotates, the post 230 moves the first end 226 of the lever arm 224, and the rotatable connection of the lever arm 224 to the stanchion 222 acts as a fulcrum in transmitting the motion of the post 230 and first end 226 to the second end 228 of the lever arm 224. The second end 228 of the lever arm 224 is in contact with a pin, spring, or magnet disposed on the release support and which is selected in conjunction with the sizing of the contact arm 66 and lever arm 24 to restrain rotation of the shaft 38 until the torque about the rotational axis 28 and shaft 38 exceeds a selected magnitude. As in the embodiments of the release means 40 of FIGS. 2–7 and 20–22, in the embodiments of FIGS. 24–28, the various forms of the pin, spring, and magnet should be secured to the contact arm 66 and/or release support 72 so that the release means 40 does not interfere with the rotation of the contact arm 66, lever arm 224, and valve 24 from the closed position to the open position when the torque exerted on the shaft 38 and release means 40 exceeds the selected magnitude; and the relative positioning of the pin, spring, magnet, contact arm 66, and lever arm 224 should be adjustable and adjusted to hold the valve 24 securely in the closed position until the torque exerted on the shaft 38 exceeds the selected magnitude.

Figure 25:
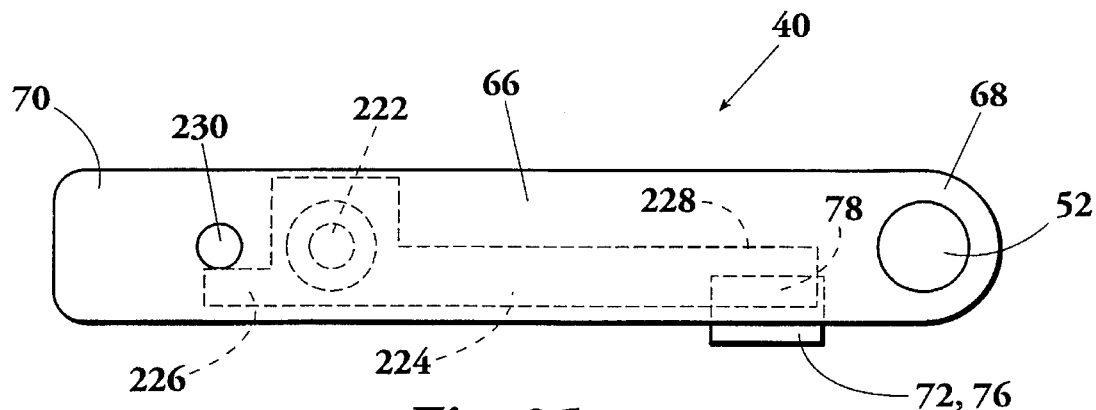
FIG. 25 is a top plan view of an embodiment of the release means of FIG. 24.

Referring to the example embodiment of FIG. 25, a first magnetic element 76 is connected to the release support 72 and a second magnetic element 78 is connected to the second 228 of the lever arm 224, the attraction of the magnetic elements preventing the second end 228 of the lever arm 224 from rotating (counterclockwise in FIG. 25) away from the release support housing 232 until the torque about shaft 38 (counterclockwise in FIG. 25) exceeds a preselected magnitude.

Figure 26:
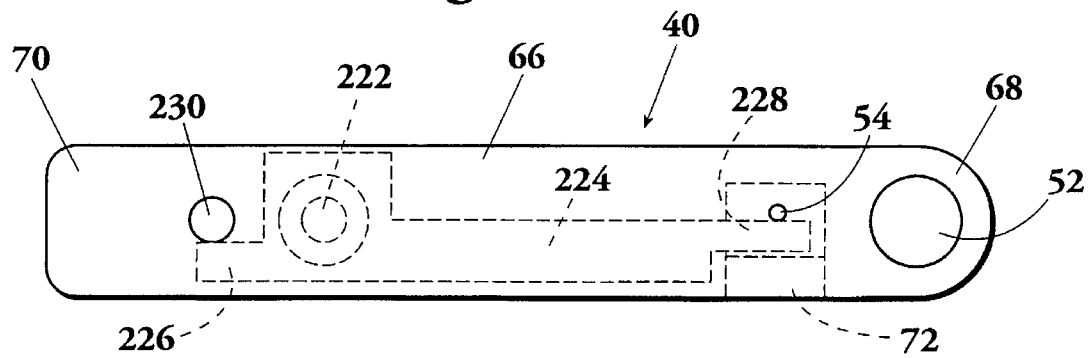
FIG. 26 is a top plan view of another embodiment of the release means of FIG. 24.

Referring to the example embodiment of FIG. 26, the release support 72 supports a pin 54 which prevents the second end 228 of the lever arm 224 from rotating (counterclockwise in FIG. 26) and allowing the shaft 38 to rotate (counterclockwise in FIG. 26) until the torque about the shaft 38 exceeds a preselected magnitude and breaks the pin 54. The pin 54 may be simply supported or cantilevered on the release support 72. If the pin 54 is cantilevered, the release support 72 may be eliminated by cantilevering the pin 54 from the contact arm 66 into obstruction with the second end 228 of the lever arm 224, as indicated by the solid line drawing of the pin 54 in FIG. 26.

Figure 27:
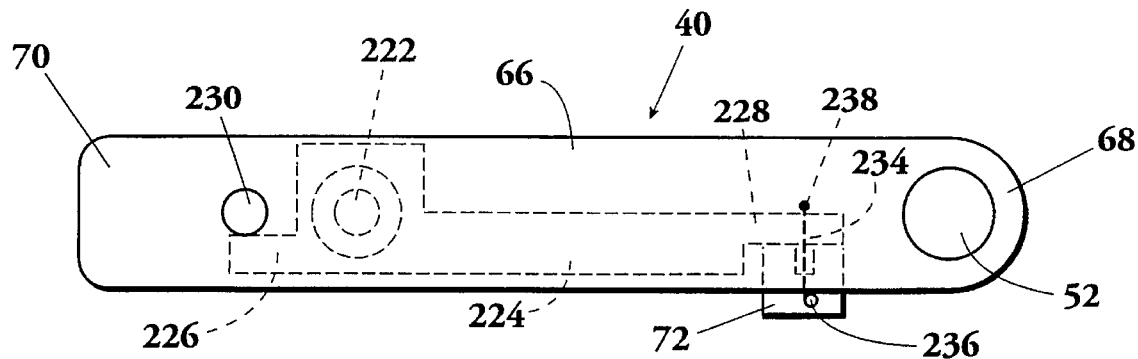
FIG. 27 is a top plan view of another embodiment of the release means of FIG. 24.

Referring to the example embodiment of FIG. 27, a tension pin or wire 234 has a first end 236 connected to the release support 72 and a second end 238 connected to the second end 228 of the lever arm 224 such that (counterclockwise) rotation of the shaft 38 is restrained by the tensile strength of the tension pin 234 until the torque about the shaft 38 exceeds the tensile strength of the wire 234 and breaks the wire 234. The tension pin 234 may be replaced with a tension spring 234, as would be known to one skilled in the art in view of the disclosure contained herein. The tension spring 234 would have the advantage of automatically and repeatably restoring the valve 24 to the closed position without replacement parts.

Figure 28:
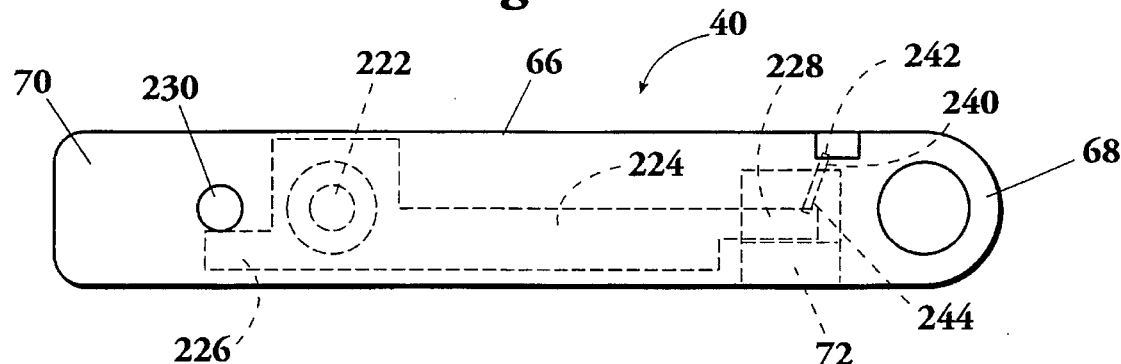
FIG. 28 is a top plan view of another embodiment of the release means of FIG. 24.

Referring to the example of FIG. 28, a buckling pin 240 has a first end 242 connected to the release support 72 and a second end 244 connected to the second end 228 of the lever arm 224 such that any rotation (counterclockwise) of the shaft 38 and valve 24 toward the open position 34 places the buckling pin 240 in compression. The compressive strength of the buckling pin 240 is selected to resist the rotation of the shaft 28 until the torque exceeds the selected magnitude and buckles or bends the pin 240. The buckling pin 240 may be replaced with a compression spring 240, as would be known to one skilled in the art in view of the disclosure contained herein. The compression spring 240 would have the advantage of repeatably restoring the valve 24 to the closed position without replacement parts.

Referring to the example of FIGS. 1 and 10, the housing 22 may be of integral, one piece construction, or assembled of components, e.g., the inlet 46 and outlet 48 may be separate components. The housing 22 may also be an integral part of the fluid pressure source, although the preferred assembly 20 is an independent device. In the prototype assembly 20, the inlet 46 and outlet 48 have a common, co-linear axis 120, as exemplified in FIGS. 1 and 9, although the housing 22 may be curved or angled, as would be known to one skilled in the art in view of the disclosure contained herein.

The housing 22 and valve 24 should be shaped to facilitate at least 90 degrees of rotation by the valve 24 (as exemplified in FIGS. 1 and 16) without interfering with the movement of the valve 24. In the prototype assembly 20, the fluid passageway 50 is about circular when viewed axially (as seen in FIGS. 3 and 8), and the valve 24 has a perimeter of about the same shape as the fluid passageway 50. Preferably the inner peripheral edge 88 of the housing seating surface 86 and the outer peripheral edge 92 of the valve seating surface 90 are both about circular when viewed along the flow axis 120.

Referring to the example of FIG. 8, as previously discussed, in the more preferred embodiment of the assembly 20, the mounting means 26 includes first shaft end 116 and second shaft end 118 which rotatably connect the valve 24 to the housing 22 and which define the rotational axis 28 of the valve 24. The rotational axis 28 is offset transversely from the diametrical axis 84 of the valve 24 by the positioning of the first and second shaft ends 116, 118 so that the fluid force in the inlet 46 of the housing 22 will create torque about the rotational axis 28, as previously discussed. The first and second shaft ends 116, 118 do not extend into the fluid passageway 50. First and second offset brackets 122, 124 extend through slots 250, 252 in the housing between the first and second shaft ends 116, 118 and fluid passageway 50. The slots 250, 252 allow the first and second offset brackets 122, 124 to transmit rotation of the valve 24 to the first and second shaft ends 116, 118 and to the outside end 52 of the shaft 38. As previously discussed, the offset brackets 122, 124 also position the valve 24 so that the rotational axis 28 of the shaft 38 and shaft ends 116, 118 lie in the seal plane 110, as seen in FIG. 9, so that the rotation of the valve 24 does not buckle or stretch the seal 96. The preferred offset brackets 122, 124 and disk bracket 254 are connected to the outlet side of the valve 24 (to the opposite side of the valve 24 from the seal 96 and valve seating surface 90) to allow alignment of the rotational axis 28 with the seal plane 110 while removing the shaft 38 and shaft ends 116, 118 from interference with the seal 96.

The disk bracket 254 is welded to the outlet side of the valve 24. The disk bracket 254 has opposite ends 253, 255 which extend off of the valve 24. The offset brackets 122, 124 are welded to the opposite ends 253, 255 of the disk bracket 254, in the prototype assembly 20. A first stop 246 extends from the first end 253 of the disk bracket 254 between the slot 250 and the valve 254 in such a manner that the first stop 246 contacts the housing 22 when the valve 24 reaches the open position. A bumper 247 of resilient material is connected to the housing 22 in such a position as to receive the stop 246 when the valve 24 reaches the open position and to cushion the impact of the stop 246 hitting the housing 22. A second stop 248 extends from the second end 255 of the disk bracket 254 between the second offset bracket 124 and the valve 24 and a corresponding second bumper 249 is provided on the housing 22 in the prototype assembly 20.

Referring to the example of FIG. 10, the preferred seal 96 and seal plane 110 are on the inlet 46 side of the valve 24. The transverse offset of the rotational axis 28 from the diameter 84 of the valve 24 creates the fluid force imbalance and torque about the rotational axis 28. The rotational axis 28 passes through the valve 24 and seal 96 in a position which creates a larger first side 100 of valve 24 and first portion 98 of the seal 96; and a smaller second side 104 of valve 24 and second portion 102 of the seal 96. Since the fluid pressure exerts greater force on the valve 24 on the larger first side 100 of the valve 24, the larger first side 100 of the valve 24 is pushed towards the outlet 48 of the housing 22, thereby defining the direction of rotation of the valve 24. By securing the first portion 98 of the seal 96 to the housing seating surface 86, the first portion 98 of the seal 96 remains on the housing seating surface 86 and is not pushed through the housing 22 as the valve 24 rotates. Similarly, since the second portion 102 of the seal 96 is secured to the valve seating surface 90 which rotates towards the inlet, the second portion 102 of the seal 96 also rotates from the closed position 32 to the open position 34 without dragging or wiping against the housing 22. It is intended to be understood that, although not the preferred embodiment and not illustrated, the housing seating surface 86, valve seating surface 90, and seal 96 may be placed on the outlet side of the valve with the offset brackets 122, 124 connected to the inlet side of the valve 24 in such a manner that the seal 96 will not drag or wipe against the housing 22 or valve 24 and the other benefits of the invention will be achieved, as would be known to one skilled in the art in view of the disclosure contained herein.

Referring to the example of FIG. 11, a view of the inlet face 292 or side of the prototype seal 96 which is placed against the housing and valve seating surfaces 86, 90 will now be described. The seal 96 has a larger, or circumferentially longer, first portion 98, a circumferentially shorter second portion 102, and first and second transitional portions 106, 108. The first portion 98 includes a web 257 for connecting the first portion to the housing seating surface 86, protuberance 136, and inside rim 126 which extends across the gap 94 for contacting the valve seating surface 90. The web 257 may be described as extending radially outwardly from the protuberance 136 and having a lip 276 which assists in securing the first portion 98 of the seal to the housing seating surface 86. The second portion 102 of the seal may be described as having an outside rim 128 which extends across to gap 94 for contacting the valve seating surface 90, protuberance 138, and a web 259 which extends radially inwardly from the protuberance 138. The web 259 includes a lip 96 which assists in securing the second portion 102 to the valve seating surface 90. As previously discussed, the rotational axis 28 of the valve 24 passes through the transitional portions 106, 108 of the seal 96 and therefore the radial sides of the protuberance 140, 142 in the transitional portions 106, 108 are free of radially extending material so that the seal may bend or flex in the transitional portions 106, 108 without interference. As previously mentioned, the seal is unsecured to the valve 24 or housing 22 in the transitional portions 106, 108. The transitional portions 106, 108 should extend circumferentially on either side of the rotational axis 28 sufficiently to allow the seal 96 and valve 24 to rotate without interference. As seen in FIG. 11, preferably the protuberance 136 of the first portion 98, protuberance 138 of the second portion 102, protuberance 140 of the first transitional portion 106, and protuberance 142 of the second transitional portion 108 form an endless, continuous protuberance. The web 257 of the first portion 98 has radial slots 256 and the web 259 of the second portion 102 has radial slots 258 which are cut into the webs 257, 259 to allow the seal material to be joined into an endless seal without binding or bunching.

Figure 29:
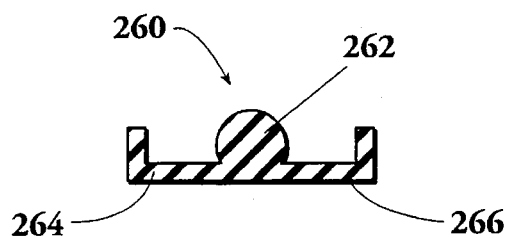
FIG. 29 is a cross-sectional view of the extrusion from which the seal of FIG. 11 is made.

FIG. 29 is a cross section of the extruded strip 260 of elastomer material which is joined end-to-end to form the seal 96. As is seen in FIG. 29, the extruded strip 260 has a central protuberance 262 with symmetrical radial extensions 264, 266 extending from each side of the protuberance 262. To make the seal 96 of FIG. 11, the length of the first portion 98 of the seal 96 is measured along the central protuberance 262, the length of the transitional portion 106 is measured and added, the length of the second portion 102 is measured and added, and the length of the second transitional portion 108 is measured and added. The strip 260 is cut at that length. The radial extension 264, 266 from the central protuberance 262 opposite the web 257 (FIG. 11) of the first portion is removed, the radial extension 264, 266 on both sides of the protuberance in the first transitional portion 106 is removed, the radial extension 264, 266 opposite the web 259 (FIG. 11) of the second portion 98 is removed, the radial extensions 264, 266 are removed in the second transitional portion 108, the slots 256, 258 are cut in the webs 257, 259, and the ends of the protuberance 262 are bonded together to form the seal 96. It is contemplated that the seal may also be formed by injection molding and other known methods. The seal 96 is preferably made of a resilient material suitable for the fluids which will be in contact with the seal 96, such as one of the elastomers commonly used in making o-rings and other resilient seals, as would be known to one skilled in the art in view of the disclosure contained herein.

FIG. 13 is an enlarged detail drawing of the radial cross section of the first portion 98 of the seal 96 and housing retainer 148, as marked on FIG. 9. The first portion 98 of seal 96 may be described as having an inside rim 126, outside rim 270, inlet face 272, and outlet face 274. The protuberance 136 extends from the outlet face 274 into the groove 134 in order to seal the gap 94 between the housing 22 and valve 24. In the prototype assembly 20, the vertical or axially extending walls of the notches 130, 132 form an angle of approximately one degree from a perpendicular to the seal plane 110, and diverge towards the inlet 46 to facilitate entry and exit of the protuberance 136 from the groove 134. Lip 276 extends from the outlet face 274 into an arcuate groove 278 in the housing seating surface 86. The groove 278 extends entirely and endlessly around the housing 22 and valve 24 in the prototype assembly 20. The lip 276 and groove 278 help secure the seal 96 to the housing seating surface 86. Other than the lip 276, the outside rim 270 is of flat, arcuate construction. The inlet face 272 of the seal 96 is flat and planar across the inside and outside rims 126, 270. The housing retainer 148 may be described as having an inside segment 280, outside segment 282, contact face 284, and exposed face 286. In the embodiment of FIG. 13, the housing retainer 148 is rectangular in cross section and extends across the radial dimension of the inlet face 272 of the seal 96. Screws 288 extend through the housing retainer 148 and seal 96 between the lip 276 and protuberance 136 in order to secure the housing retainer 148 and seal 96 to the housing 22. The housing retainer 148 does not extend into the first and second transitional portions 106, 108 (FIG. 15) of the seal 96, as previously discussed.

FIG. 14 is an enlarged detail drawing of the radial cross section of the second portion 102 of the seal 96 and valve retainer 150 as marked on FIG. 9. The second portion 102 of the seal 96 may be described as having an outside rim 128, inside rim 290, inlet face 292, and outlet face 294. The protuberance 138 extends from the outlet face 294 into the groove 134 in order to seal the gap 94 between the housing 22 and valve 24. In the prototype assembly 20, the vertical or axially extending walls of the notches 130, 132 form an angle of approximately one degree from a perpendicular to the seal plane 110, and diverge towards the inlet 46 to facilitate entry and exit of the protuberance 138 from the groove 134. Lip 296 extends from the inside rim 290 of the inlet face 292 into an arcuate groove 298 in the valve seating surface 90. The groove 298 extends entirely and endlessly around the valve 24 in the prototype assembly 20. The lip 296 and groove 298 help secure the seal 96 to the valve seating surface 90. Other than the lip 296, the inside rim 290 is of flat, arcuate construction and connects the lip 296 to the protuberance 138. The inlet face 292 of the second portion 102 of the seal 96 is flat and planar across the inside and outside rims 290, 128. The valve retainer 150 may be described as having an inside segment 300, outside segment 302, contact face 304, and exposed face 306. In the embodiment of FIG. 14, the valve retainer 150 is rectangular in cross section. The outside segment 302 extends entirely across the radial dimension of the inlet face 292 of the second portion 102 of the seal 96 and the inside segment 300 extends off of the seal 96 and onto the valve seating surface 90. The valve seating surface 90 is relieved or cut out so that the exposed face 306 of the inside segment 300 of the valve retainer 150 is coplanar with the surface of the valve 24. The inside segment 300 of the valve retainer 150 is secured to the valve 24 with screws 288, which do not pass through the seal 96. The valve retainer 150 does not extend into the first and second transitional portions 106, 108 (FIG. 15) of the seal 96, as previously discussed. The screws 288 on the housing retainer 148 of FIG. 13 extend through the outside rim 270 of the first portion 98 of the seal 96 (rather than not passing through the seal 96 as do the screws 288 of the second portion 102 illustrated in FIG. 14) to accommodate the physical restraints imposed by the structure of the housing 22.

The following FIGS. 30–42 present various embodiments of the seal 96. To simplify the explanation, a cross-sectional view of only the second portion 102 of each embodiment of the seal 96 and valve retainer 150 are illustrated. It is intended to be understood that all embodiments of the seal 96 will be unretained or unsecured in the first and second transitional portions 98, 102 and that the unillustrated first portions 98 are essentially the mirror image of the illustrated second portions, although, as with the embodiments of FIGS. 13 and 14, structural changes may be made in the first portions 98 to accommodate space limitations on the housing 22 and housing seating surface 86, as would be known to one skilled in the art in view of the disclosure contained herein. It should also be understood that in all embodiments of the seal, the housing retainer 148 and/or valve retainer 150 may be supplemented with a chemical bonding of the appropriate portion of the seal 96 to the housing 22, valve 24, and/or the retainers 148, 150; and the retainers 148, 150 may be replaced by chemical bonding of the seal 96 to the appropriate one of the housing 22 or valve 24.

Figure 30:
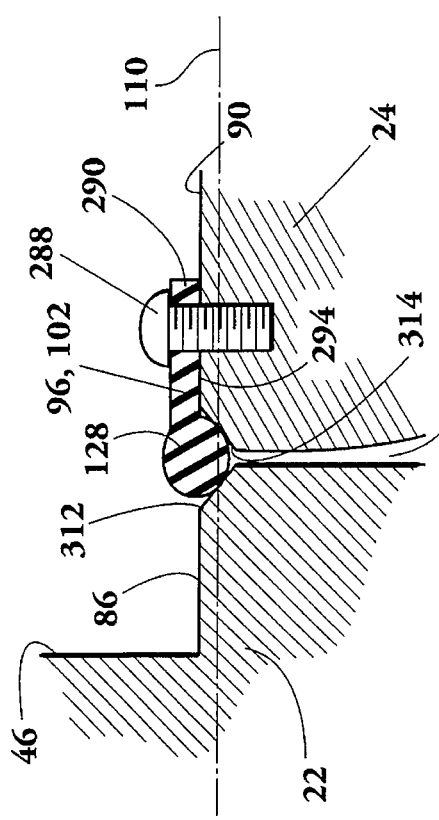
FIG. 30 is a cross-sectional view of another embodiment of the seal of the present invention.
Figure 31:
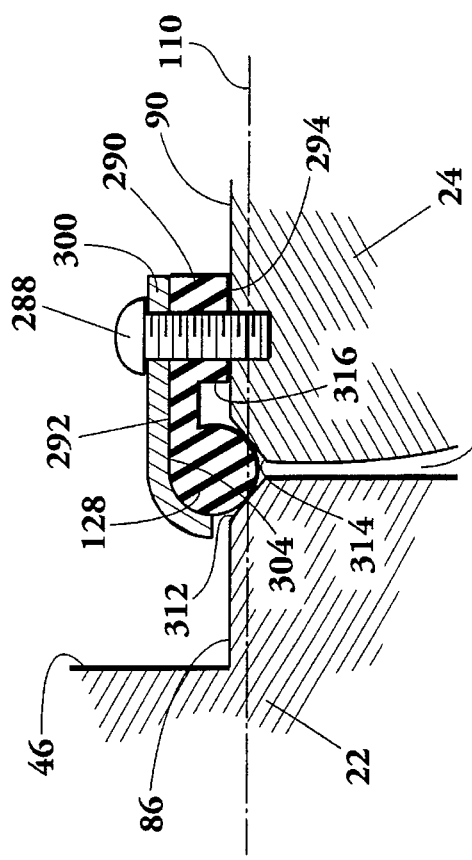
FIG. 31 is a cross-sectional view of another embodiment of the seal of the present invention.

In the embodiment of FIG. 30, the seal 96 is about rectangular in cross section. The outside rim 128 of the seal 96 extends across the gap 94 onto the housing seating surface 86, and the inside rim 290 of the seal 96 extends across the gap 94 onto the valve seating surface 90. The inside segment 300 of the valve retainer 150 is fastened directly to the valve seating surface 90 with screws 288. The contact face 304 of the outside segment 302 of the valve retainer 150 is relieved to form a slot in the valve retainer 150 which receives the inside rim 290 of the seal 96 for fastening seal 96 to the valve seating surface 90. The outside segment 302 of the valve retainer 150 extends from the valve seating surface 90 to approximately the center of the gap 94.

In the embodiment of FIG. 31, the edge 312 of the valve seating surface 86 and the adjacent edge 314 of the housing seating surface 90 are beveled to create a generally v-shaped notch above the gap 94 in the closed position 32 of the valve 24. The outside rim 128 of the seal 96 is circular in cross section and sized such that the center of the circular outside rim 128 is aligned with the gap 94 and about coplanar with the housing and valve seating surfaces 86, 90 in the closed position 32 of the valve 24. The inside rim 290 of the seal 96 is generally rectangular in cross section, is smaller in its axial dimension than the radius of the circular outside rim 128, and extends eccentrically from the circular outside rim 128 with the outlet face 294 of the inside rim 290 about aligned with the center of the circular outside rim 128. The inside rim 290 is fastened directly to the valve seating surface 90 with screws 288.

In the embodiment of FIG. 32, the adjacent edges 312, 314 of the housing and valve seating surfaces 86, 90 are beveled to form a generally v-shaped notch above the gap 94. The outside rim 128 of the seal 96 is circular in cross section and is positioned such that the center of the circular outside rim 128 is aligned with the gap 94. The inside rim 290 of the seal 96 is generally rectangular in cross section with its longer axis aligned with the center of the circular outside rim 128 and extending onto the valve seating surface 90. The inside rim 290 is smaller in axial dimension (vertical in FIG. 32) than the radius of the circular outside rim 128. The contact face 304 of the valve retainer 150 does not directly contact the valve seating surface 90 but rests entirely upon the inlet face 292 of the seal 96. The valve retainer 150 is shaped such that both its contact face 304 and exposed face 306 follow the profile of the radial cross section of the inlet face 292 of the seal 96 and extend across the gap on the seal 96. Screws 288 pass through the inside segment 300 and inside rim 290 to fasten the seal 96 and valve retainer 150 to the valve seating surface 90.

In the embodiment of FIG. 33, the adjacent edges 312, 314 of the housing and valve seating surfaces 86, 90 are beveled to created a v-shaped notch above the gap 94. The outside rim 128 of the seal 96 is circular in cross section with the radius of the circular outside rim 128 being larger than the depth of the V-shaped notch. The inside rim 290 of the seal 96 is generally rectangular in cross section with the inlet face 292 extending tangentially from the outside surface of the circular outside rim 128. The axial dimension (vertical in FIG. 33) of the inside rim 290 is less than the diameter of the circular outer rim 128 so that the outlet face 294 of the inside rim 290 is in contact with the valve seating surface 90 when the circular outside rim 128 is sealingly seated against the adjacent edges 312, 314 of the housing and valve seating surfaces 86, 90. A notch 316 is formed in the inlet face 292 of the seal 96 between the outside rim 128 and inside 290. The contact face 304 of the valve retainer 150 does not directly contact the valve seating surface 90 but is entirely supported by the inlet face 292 of the seal 96. The contact face 304 and outlet face 306 of the valve retainer 150 are parallel and are shaped to follow the profile of the inlet face 292 of the seal 96 across the gap 94. Screws 288 pass through the inside segment 300 and inside rim 290 to fasten the seal 96 and retainer 150 to the valve seating surface 90.

In the example embodiment of FIG. 34, the outside rim 128 and inside rim 290 of the seal 96 are both circular in cross section and have substantially the same radius. The seal 96 is positioned such that the circular outside rim 128 and circular inside rim 290 contact their respective housing and valve seating surfaces 86, 90 about equidistantly from the gap 94. The inlet face 292 of the seal 96 extends tangentially to the outside surfaces of the circular outside and inside rims 128, 290 and forms a web 318 connecting the outside and inside rims 128, 290. The web 318 is smaller in axial dimension than the diameter of the circular outside and rims 128, 290. The contact face 304 of the outside segment 302 of the valve retainer 150 has substantially the same shape as the profile of the inlet face 292 of the seal 96 and extends across the gap 94 on the seal 96. The remainder of the outside segment 302 is generally rectangularly shaped. The contact face 304 of the inside segment 300 of the valve retainer 150 directly contacts the valve seating surface 90 and a screw 288 passes through the outside segment 302 without passing through the seal 96.

In the example embodiment of FIG. 35, the outside and inside rims 128, 290 of the seal 96 are both circular in cross section and have approximately the same radius. The inlet and outlet faces 292, 294 of the seal 96 between the outside and inside rims 128, 290 form a connecting web 318 which is smaller in axial dimension than the diameter of the circular rims 128, 290 and which is positioned substantially closer to the seating surfaces 86, 90 than to the opposite extremity of the rims 128, 290. The seal 96 is positioned so that the outside and inside rims 128, 290 are approximately equidistantly spaced from the gap 94. The contact face 304 of the outside segment 302 of the valve retainer 150 has a ridge 320 extending axially therefrom which contacts the inlet face 292 of web 318. The circular rims 128, 290 contact inlet face 304 on either side of the ridge 320. The outside segment 302 extends completely across both rims 128, 290 of the seal 96. The inside segment 300 of the valve retainer 150 is fastened directly to the valve seating surface 90 with screws 288 which do not pass through the seal 96.

Referring to example FIG. 36, the housing seating surface 86 has a housing groove 322 spaced away from the gap 94 and the valve seating surface 90 has a valve groove 324 spaced away from the gap 94. The housing groove 322 creates a housing landing area 326 and the valve groove 324 creates an adjacent valve landing area 328 which contact the outlet face 294 of the seal 96 on either side of the gap 94. The seal 96 is generally rectangular in cross section and the outside rim 128 extends over groove 322 with the inside rim 290 extending over groove 324. The inside segment 300 of the valve retainer 150 is connected directly to the valve seating surface 90 with a screw 288 which does not pass through seal 96. The contact face 304 at the outside segment 302 of valve retainer 150 is shaped to follow the profile of the inlet face 292 of the seal 96.

Example FIG. 37 differs from the embodiment of FIG. 36 only in that the seal 96 and valve retainer 150 are both rectangular in cross section and the screw 288 or equivalent fastener passes through both the valve retainer 150 and seal 96.

In the embodiment of FIG. 38, the housing seating surface 86 and valve seating surface 96 have notches 130, 132 which form groove 134, as previously discussed (FIGS. 13 and 14). The seal 96 has a protuberance 326 which extends from the outlet face 294 into the groove 134. The inlet face 292 of the seal 96 includes a ridge 328 extending away from the valve seating surface 86 at the outside rim 128 and a ridge 330 extending away from the valve seating surface 90 at the inside rim 290. The contact face 304 of the outside segment 302 of the valve retainer 150 is shaped to contact the inlet face 292 between the ridges 328, 330 and to contact the outside surfaces of ridge 330. The valve retainer 150 does not extend over ridge 328 of the outside rim 128. The inside segment 300 of the valve retainer is in direct contact with the valve seating surface 90 and the screw 288 passes directly through the inside segment 300 without passing through seal 96.

In the embodiment of FIG. 39, the seal 96 is generally shaped like a pyramid in cross section with an apex 332 of the pyramid centered over the gap 94. The inside rim 290 of the seal 96 is bonded to the valve seating surface 90 to retain the seal 96 to the valve seating surface 90.

The embodiment of FIG. 40 uses the same pyramid shaped seal 96 of FIG. 39. In the embodiment of FIG. 40, a valve retainer 150 is provided having an inside segment 300 that is fastened directly to the valve seating surface 90 with a screw which does not pass through the seal 96. The outside segment 302 of the valve retainer 150 is shaped in cross section such that the contact face 304 and exposed face 306 are parallel and follow the contour of the pyramid shaped seal over the apex 332 of the seal with the outside segment 302 extending over the gap 94 but not extending beyond the outside rim 128 of the seal 96.

In the embodiment of FIG. 41, the housing seating surface 86 has a notch 334 adjacent the gap 94 and a groove 336 spaced away from the notch 334, the notch 334 and groove 336 forming a ridge 338 in the housing seating surface 86. The valve seating surface 90 has a notch 340 adjacent the gap 94, a groove 342 spaced away from the notch 340, and a ridge 344 formed between the notch 340 and groove 342. The outside rim 128 and inside rim 290 of the seal 96 extend equidistantly onto the housing seating surface 86 and valve seating surface 24 to approximately the center of the grooves 336, 342. The outlet face 294 of the seal 96 is shaped to complementarily fit into the notches 334, 340 and sealingly engage ridges 338, 344. The inside rim 290 of the seal is bonded to the valve seating surface 90.

In the embodiment of FIG. 42, a groove 346 is provided in the housing seating surface 86 and groove 348 is provided in the valve seating surface 90. The grooves 346, 348 are about equidistantly spaced from the gap 94. The seal 96 includes a rectangular web 350 extending between the outside rim 128 and inside rim 290. The outside rim 128 includes a protuberance 352 which extends into groove 346 and the inside rim 290 includes a protuberance 354 which extends into groove 348. In the closed position of the valve 24 the outlet face 294 of the seal 96 between the protuberances 352, 354 contacts the adjacent edges of the housing and valve seating surfaces 86, 90. The inlet face 292 of the seal 96 is substantially flat or planar. The inside segment 300 of the valve retainer 150 is secured directly to the valve seating surface 90 with a screw 288. The outside segment 302 extends across the gap to about the middle of the groove 346 in the housing seating surface 86. The contact face 304 of the outside segment 302 is relieved or cut out and contoured to receive the inlet face 292 of the seal 96. Preferably, the seal 96 is bonded to the outside segment 302 of the valve retainer 150.

Figure 43:
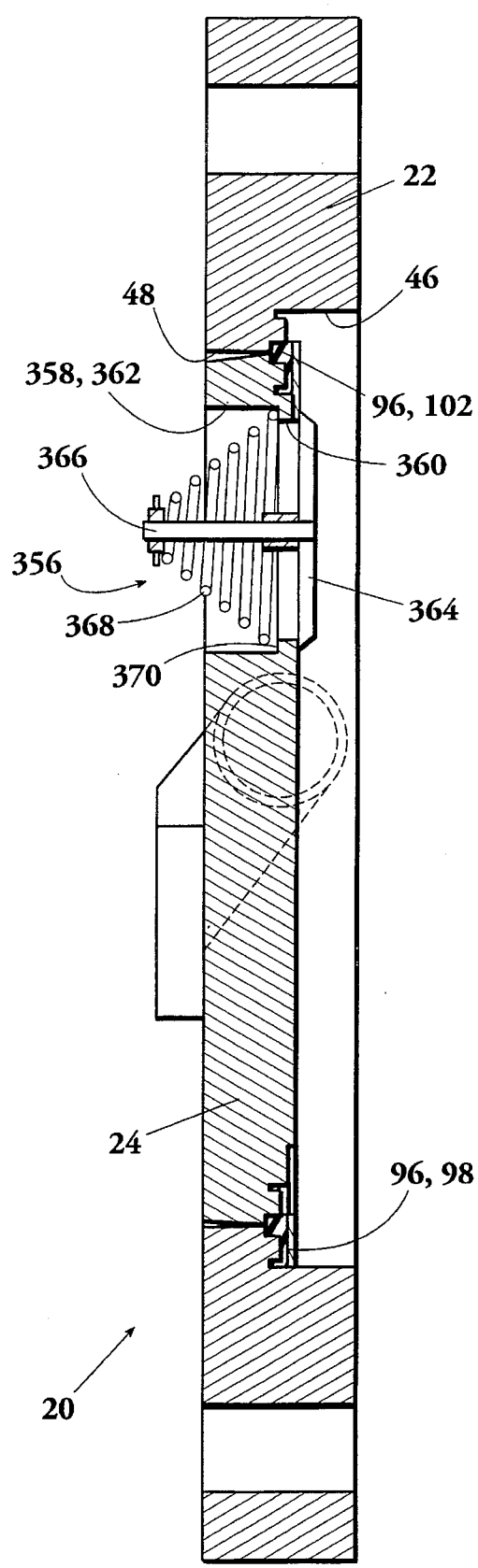
FIG. 43 is a side-sectional view of an embodiment of a vacuum relief means for the rotatable valve assembly.

Referring to the example of FIG. 43, the assembly 20 may include vacuum relief means 356 for sensing a vacuum in the housing inlet 46 and opening a flow passageway 358 between the inlet 46 and outlet 48 of the housing 22 in order to relieve the vacuum. In the example of FIG. 43, the flow passageway 358 passes through and is located in the valve 24. The flow passageway has an inlet 360 and an outlet 362 corresponding with the inlet 46 and outlet 48 of the housing 22. A diaphragm 364 of larger diameter than the flow passageway 358 extends across and seals the inlet 360 of the flow passageway. A spring frame 366 is connected to the outlet side of the valve 24 and supports a spring 368 which holds the diaphragm 364 in sealing contact with the inlet side of the valve 24. Normally, the positive fluid pressure in the inlet 46 of the housing and the spring 368 force the diaphragm 364 into sealing engagement with the valve 24. If a negative pressure drop (a greater pressure on the outlet 48 side of the valve than the inlet 46 side of the valve) or a vacuum in the inlet 46 of the housing 22 develops while the valve 24 is in the closed position, the spring 368 will allow the diaphragm 364 to open the flow passageway 358 and relieve the negative pressure drop or vacuum, thereby preventing potential damage to the seal 96. The strength of the spring 368 is selected to provide the desired set pressure at which vacuum relief will begin. In the example of FIG. 43, the spring frame 366 and spring 368 are inset into the valve 24 onto an annular ledge 370 which is created by making the diameter of the outlet 362 larger than the diameter of the inlet 360.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Rotatable valve assembly comprising:

a housing having an inlet and an outlet defining a fluid passageway through the housing and a seating surface having an inner peripheral edge extending around the passageway;

a valve, located in the passageway and having a seating surface with an outer peripheral edge extending around the valve, the valve being rotatable between a closed position in which the housing and valve seating surfaces are about coplanar and define a gap between the inner peripheral edge of the housing seating surface and the outer peripheral edge of the valve seating surface, and an open position in which the housing and valve seating surfaces are not coplanar;

mounting means for rotatably mounting the valve about a rotational axis in the housing; and a seal for sealing the gap between the seating surfaces and preventing flow through the passageway in the closed position of the valve, the seal having a first portion secured to the housing seating surface on a first side of the rotational axis and extending across the gap toward the valve seating surface, a second portion secured to the valve seating surface on a second side of the rotational axis and extending across the gap toward the housing seating surface, a first transitional portion coinciding with the rotational axis, and a second transitional portion coinciding with the rotational axis, the seal being unsecured in the transitional portions so that the seal may flex in the transitional portions as the valve rotates between the closed position and the open position; and power means for rotating the valve between the closed position and the open position.

2. Assembly of claim 1:

wherein the first and second portions of the seal define a seal plane in the closed position of the valve.

3. Assembly of claim 2:

wherein the second portion of the seal moves out of the seal plane with the valve as the valve rotates from the closed position to the open position.

4. Assembly of claim 2:

wherein the rotational axis of the valve is defined as lying in the seal plane.

5. Assembly of claim 1, in which:

the first portion of the seal includes an inside rim extending across the gap and contacting the valve seating surface in the closed position of the valve;

the second portion of the seal includes an outside rim extending across the gap and contacting the housing seating surface in the closed position of the valve; and the first and second transitional portions of the seal extend across the gap and contact the housing seating surface and the valve seating surface in the closed position of the valve.

6. Assembly of claim 5 in which:

the inner peripheral edge of the housing seating surface has a notch extending around the inner peripheral edge, the outer peripheral edge of the valve seating surface has a notch extending around the outer peripheral edge, and the notches form a groove coinciding with the gap between the seating surfaces;

the inside rim of the first portion of the seal has a protuberance extending into the notch in the inner peripheral edge of the housing seating surface and extending across the groove into sealing contact with the valve seating surface in the closed position of the valve;

the outside rim of the second portion of the seal has a protuberance extending into the notch in the outer peripheral edge of the valve seating surface and extending across the groove into sealing contact with the housing seating surface in the closed position of the valve; and the first and second transitional portions of the seal each have a protuberance extending into the groove and making sealing contact with the notches in the housing and valve seating surfaces in the closed position of the valve.

7. Assembly of claim 6:

wherein the inside rim protuberance, outside rim protuberance, and transitional portion protuberances form an endless protuberance.

8. Assembly of claim 7 wherein:

the inside rim protuberance remains in the notch in the inner peripheral edge of the housing seating surface in all positions of the valve; and the outside rim protuberance remains in the notch in the outer peripheral edge of the valve seating surface in all positions of the valve.

9. Assembly of claim 1 in which:

the first portion of the seal comprises a housing retainer, connected to the housing and the first portion of the seal, for securing the first portion of the seal to the housing;

the second portion of the seal comprises a valve retainer, connected to the valve and the second portion of the seal, for securing the second portion of the seal to the valve; and wherein the retainers do not extend into the transitional portions.

10. Assembly of claim 9:

wherein the housing retainer extends across the gap with the first portion of the seal connected to the housing retainer and disposed between the housing retainer and the gap, the housing retainer urging the first portion of the seal into sealing contact with the housing and valve seating surfaces in the closed position of the valve; and wherein the valve retainer extends across the gap with the second portion of the seal connected to the valve retainer and disposed between the valve retainer and the gap, the valve retainer urging the second portion of the seal into sealing contact with the housing and valve seating surfaces in the closed position of the valve.

11. Assembly of claim 1 in which the mounting means comprises:

a first shaft end rotatably disposed in the housing;

a second shaft end rotatably disposed in the housing, the first and second shaft ends being aligned to define the rotational axis of the valve;

a first offset bracket connected between the first shaft end and the valve with the joining of the first offset bracket to the valve being offset from the rotational axis; and a second offset bracket connected between the second shaft end and the valve with the joining of the second offset bracket to the valve being offset from the rotational axis.

12. Assembly of claim 11:

wherein the seal defines a seal plane in the closed position of the valve and the rotational axis of the valve lies in the seal plane.

13. Assembly of claim 1 in which the power means comprises:

conversion means for converting fluid pressure in the housing into torque exerted about the shaft.

14. Assembly of claim 13:

wherein the conversion means is defined as applying greater fluid force to the valve on one side of the rotational axis of the valve.

15. Assembly of claim 13 in which the mounting means includes a shaft having an outside end extending through the housing, the shaft being rotatable with the valve, the assembly comprising:

release means, located outside the housing, for preventing rotation of the shaft and valve from the closed position when the torque exerted on the shaft is below a selected magnitude and for releasing the shaft in order to allow rotation of the shaft and valve to the open position when the torque exerted on the shaft exceeds a selected magnitude.

16. Assembly of claim 15 in which the release means comprises:

deformable means for making deformable contact between the outside of the housing and the outside end of the shaft.

17. Assembly of claim 16 in which the deformable means comprises:

a pin, connected between the housing and the shaft, which bends when the torque exerted on the shaft exceeds a selected magnitude.

18. Assembly of claim 17:

wherein the pin is connected between the shaft and the housing so that the pin is placed in compression by the torque exerted on the shaft.

19. Assembly of claim 16 in which the deformable means comprises:

a pin, connected between the shaft and the housing, which breaks when the torque exerted on the shaft exceeds a selected magnitude.

20. Assembly of claim 19:

wherein the pin is connected between the shaft and the housing so that the pin is placed in tension by the torque exerted on the shaft.

21. Assembly of claim 19:

wherein the pin is connected between the shaft and the housing so that the pin is subjected to shear forces by the torque exerted on the shaft.

22. Assembly of claim 15 in which the release means comprises:

a contact arm, having a first end connected to the outside end of the shaft and a second end extending from the shaft;

a release support connected to the housing; and a pin, connected to the release support and obstructing rotation of the second end of the contact arm, shaft, and valve from the closed position of the valve until the torque exerted on the shaft exceeds a selected magnitude.

23. Assembly of claim 22:

wherein the pin is disposed on the release support so as to be subjected to compressive forces by the contact arm.

24. Assembly of claim 22:

wherein the pin is disposed on the release support so as to be subjected to shear forces by the contact arm.

25. Assembly of claim 22:

wherein the pin is connected between the release support and the contact arm so as to be placed in tension by the contact arm.

26. Assembly of claim 15 in which the release means comprises:

a contact arm having a first end connected to the outside end of the shaft and a second end extending from the shaft;

a release support connected to the housing;

a magnetic catch having a first magnetic element located on the contact arm and a second magnetic element located on the release support, the magnetic attraction between the first and second magnetic elements preventing rotation of the contact arm, shaft, and valve from the closed position.

27. Assembly of claim 15, comprising:

reclosure means, located outside the housing, for returning the valve to the closed position after the valve has been opened.

28. Assembly of claim 27 in which the reclosure means comprises:

a torsion spring connected between the outside end of the shaft and the housing.

29. Assembly of claim 27 in which the reclosure means comprises:

a first magnetic media having magnetic poles disposed in the outside and of the shaft; and a second magnetic media having magnetic poles disposed in the housing, the first and second magnetic media being oriented so that the like magnetic poles of the first and second magnetic media bias the shaft and valve from the open position to the closed position.

30. Assembly of claim 27 in which the reclosure means comprises:

a reclosure arm connected to and extending from the outside end of the shaft; and a counterweight, connected to the arm, for urging the shaft and valve from the open position to the closed position.

31. Assembly of claim 1, comprising:

vacuum relief means for sensing a vacuum in the housing inlet and opening a flow passageway between the inlet and the outlet of the housing in order to relieve the vacuum.

32. Rotatable valve assembly comprising:

a housing having an inlet and an outlet defining a fluid passageway through the housing and a housing seating surface having an inner peripheral edge extending around the passageway;

a valve located in the passageway and rotatable between a closed position and open position, the valve including a valve seating surface having an outer peripheral edge extending around the valve; the housing and valve seating surfaces being about coplanar and defining a gap between their inner and outer peripheral edges in the closed position of the valve, and being not coplanar in the open position of the valve;

mounting means for rotatably mounting the valve in the housing about a rotational axis and including a shaft having an outside end extending through the housing, the shaft being rotatable with the valve;

conversion means for converting fluid pressure in the housing into torque exerted on the shaft;

release means, located outside the housing, for preventing rotation of the shaft and valve from the closed position when the torque exerted on the shaft is below a selected magnitude and for releasing the shaft in order to allow rotation of the shaft and valve to the open portion when the torque exerted on the shaft exceeds a selected magnitude; and a seal for sealing the gap between the seating surfaces and preventing flow through the passageway in the closed position of the valve, the seal having a first portion secured to the housing seating surface on a first side of the rotational axis and extending across the gap toward the valve seating surface, a second portion secured to the valve seating surface on a second side of the rotational axis and extending across the gap toward the housing seating surface, a first transitional portion coinciding with the rotational axis, and a second transitional portion coinciding with the rotational axis, the seal being unsecured to the housing or the valve in the transitional portions so that the seal may flex in the transitional portions as the valve rotates between the closed position and the open position.

33. Assembly of claim 32:

wherein the first and second portions of the seal define a seal plane in the closed position of the valve.

34. Assembly of claim 33:

wherein the second portion of the seal moves out of the seal plane with the valve as the valve rotates from the closed position to the open position.

35. Assembly of claim 33:

wherein the rotational axis of the valve is defined as lying in the seal plane.

36. Assembly of claim 32, in which:

the first portion of the seal includes an inside rim extending across the gap and contacting the valve seating surface in the closed position of the valve;

the second portion of the seal includes an outside rim extending across the gap and contacting the housing seating surface in the closed position of the valve; and the first and second transitional portions of the seal extend across the gap and contact the housing seating surface and the valve seating surface in the closed position of the valve.

37. Assembly of claim 36 in which:

the inner peripheral edge of the housing seating surface has a notch extending around the inner peripheral edge, the outer peripheral edge of the valve seating surface has a notch extending around the outer peripheral edge, and the notches form a groove coinciding with the gap between the seating surfaces;

the inside rim of the first portion of the seal has a protuberance extending into the notch in the inner peripheral edge of the housing seating surface and extending across the groove into sealing contact with the valve seating surface in the closed position of the valve;

the outside rim of the second portion of the seal has a protuberance extending into the notch in the outer peripheral edge of the valve seating surface and extending across the groove into sealing contact with the housing seating surface in the closed position of the valve; and the first and second transitional portions of the seal each have a protuberance extending into the groove and making sealing contact with the notches in the housing and valve seating surfaces in the closed position of the valve.

38. Assembly of claim 37:

wherein the inside rim protuberance, outside rim protuberance, and transitional portion protuberances form an endless protuberance extending around the valve.

39. Assembly of claim 38 wherein:

the inside rim protuberance remains in the notch in the inner peripheral edge of the housing seating surface in all positions of the valve; and the outside rim protuberance remains in the notch in the outer peripheral edge of the valve seating surface in all positions of the valve.

40. Assembly of claim 32 in which:

the first portion of the seal comprises a housing retainer, connected to the housing and the first portion of the seal, for securing the first portion of the seal to the housing;

the second portion of the seal comprises a valve retainer, connected to the valve and the second portion of the seal, for securing the second portion of the seal to the valve; and wherein the retainers do not extend into the transitional portions.

41. Assembly of claim 40:

wherein the housing retainer extends across the gap with the first portion of the seal connected to the housing retainer and disposed between the housing retainer and the gap, the housing retainer urging the first portion of the seal into sealing contact with the housing and valve seating surfaces in the closed position of the valve; and wherein the valve retainer extends across the gap with the second portion of the seal connected to the valve retainer and disposed between the valve retainer and the gap, the valve retainer urging the second portion of the seal into sealing contact with the housing and valve seating surfaces in the closed position of the valve.

* * * * *

UNITED STATES PATENT AND TRADEMARK OFFICE
CERTIFICATE OF CORRECTION

PATENT NO. : 5,607,140

DATED : March 4, 1997

INVENTOR(S) : Edward H. Short, III; John A. Tomasko; Stephen P. Farwell

It is certified that error appears in the above-identified patent and that said Letters Patent is hereby corrected as shown below:

Col. 27, claim 32, line 33, delete "portion" and substitute --position-- therefor.

Signed and Sealed this

Eighth Day of July, 1997

Attest:

BRUCE LEHMAN

Attesting Officer

Commissioner of Patents and Trademarks